US010928794B2

(12) United States Patent
Bennett et al.

(10) Patent No.: US 10,928,794 B2
(45) Date of Patent: Feb. 23, 2021

(54) FAULT DETECTION SYSTEMS AND METHODS FOR POWER GRID SYSTEMS

(71) Applicant: Emera Technologies LLC, Tampa, FL (US)

(72) Inventors: Robert Ross Bennett, Tampa, FL (US); Luis Eduardo Zubieta, Oakville (CA)

(73) Assignee: Emera Technologies LLC, Tampa, FL (US)

( * ) Notice: Subject to any disclaimer, the term of this patent is extended or adjusted under 35 U.S.C. 154(b) by 115 days.

(21) Appl. No.: 16/230,203

(22) Filed: Dec. 21, 2018

(65) Prior Publication Data

US 2019/0212713 A1    Jul. 11, 2019

Related U.S. Application Data

(60) Provisional application No. 62/613,991, filed on Jan. 5, 2018, provisional application No. 62/620,981, filed on Jan. 23, 2018.

(51) Int. Cl.
| | |
|---|---|
| *G05B 19/042* | (2006.01) |
| *H02H 1/00* | (2006.01) |
| *H02H 7/26* | (2006.01) |
| *H02H 7/28* | (2006.01) |
| *H02J 3/32* | (2006.01) |
| *H02J 13/00* | (2006.01) |

(52) U.S. Cl.
CPC ......... *G05B 19/042* (2013.01); *H02H 1/0007* (2013.01); *H02H 1/0092* (2013.01); *H02H 7/268* (2013.01); *H02H 7/28* (2013.01); *H02J 3/32* (2013.01); *H02J 13/00* (2013.01); *G05B 2219/2639* (2013.01)

(58) Field of Classification Search
CPC ..................................... H02J 3/32; H02J 3/00
USPC ........................................................ 700/295
See application file for complete search history.

(56) References Cited

U.S. PATENT DOCUMENTS

| | | |
|---|---|---|
| 7,110,231 B1 | 9/2006 | De La Ree et al. |
| 8,983,669 B2 | 3/2015 | Forbes, Jr. |
| 9,007,735 B2 | 4/2015 | Park |
| 2009/0073726 A1 | 3/2009 | Babcock |
| 2010/0208501 A1 | 8/2010 | Matan et al. |
| 2010/0219688 A1* | 9/2010 | Shyu ........................ H02J 7/35 307/66 |
| 2012/0049629 A1 | 3/2012 | Miller et al. |

(Continued)

OTHER PUBLICATIONS

Apple et al., (2013) Editors "Foundations of Smart Grid," First Edition, Pacific Crest.

(Continued)

*Primary Examiner* — Md Azad
(74) *Attorney, Agent, or Firm* — Finnegan, Henderson, Farabow, Garrett & Dunner, LLP

(57) ABSTRACT

This application discloses a system that may comprise at least a portion of a supply network. The system may further comprise a load controller that controls current flow with a current level of I1 into a load network that provides power to one or more loads from the at least a portion of the supply network according to a preprogrammed load curve. The system may also comprise a protection system that isolates the at least a portion of the supply network from the load controller in response to detecting a current pattern that is inconsistent with the preprogrammed load curve.

38 Claims, 15 Drawing Sheets

(56) References Cited

U.S. PATENT DOCUMENTS

| | | | | |
|---|---|---|---|---|
| 2012/0181865 A1* | 7/2012 | Muthu | ............... | H02J 1/08 307/26 |
| 2013/0088084 A1* | 4/2013 | Szu | ............... | H02J 1/10 307/66 |
| 2013/0193766 A1* | 8/2013 | Irwin | ............... | H02H 7/268 307/82 |
| 2013/0286521 A1* | 10/2013 | Park | ............... | H02H 3/066 361/57 |
| 2014/0094979 A1 | 4/2014 | Mansfield | | |
| 2016/0006591 A1 | 1/2016 | Huomo | | |
| 2016/0118792 A1 | 4/2016 | Rosendahl | | |
| 2017/0250550 A1 | 8/2017 | Miftakhov et al. | | |
| 2019/0389552 A1* | 12/2019 | Rembach | ............... | B63H 21/17 |

OTHER PUBLICATIONS

Bird et al. (Sep. 2013) "Integrating Variable Renewable Energy: Challenges and Solutions," National Renewable Energy Laboratory, NREL/TP-6A20-6045, (14 pages).

Bumby et al., (2009) "Comparative Life Cycle Assessment (LCA) of overhead and underground medium voltage power distribution," IEEE International Symposium on Sustainable Systems and Technology, Phoenix, AZ, pp. 1-1.

Dragicevic, et al. (2014) "Supervisory Control of an Adaptive-Droop Regulated DC Microgrid With Battery Management Capability," IEEE Transactions on Power Electronics, 29(2), pp. 695-706.

Dragicevic, et al. (2016) "DC Microgrids—Part II: A Review of Power Architectures, Applications and Standardization Issues" IEEE Transactions on Power Electronics, 31(5), pp. 3528-3549.

Kumagai, (2014) "The rise of the personal power plant," 2014, IEEE Spectrum, vol. 51, Issue 6, pp. 54-59.

Nabours, (May-Jun. 2009) "Dalziel revisited," IEEE Industry Applications Magazine, vol. 15, No. 3, pp. 18-21.

Pabla et al., (2011) "Electric Power Distribution," McGraw-Hill Professional, Ch. 7 pp. 308-342, Sixth Edition.

Qi et al., (2017) "DC power distribution: New opportunities and challenges," 2017, IEEE Second International Conference on DC Microgrids (ICDCM), Nuremburg, pp. 40-46.

Saeedifard et al., (2010) "DC Power Systems: Challenges and opportunities," IEEE PES General Meeting, Providence, RI, pp. 1-7.

International Search Report and Written Opinion, dated Mar. 27, 2019, issued in corresponding International Application No. PCT/US2019/012198 filed Jan. 3, 2019 (14 pages).

* cited by examiner

FAULT DETECTION SYSTEMS AND METHODS FOR POWER GRID SYSTEMS

This application claims priority to U.S. provisional application No. 62/613,991, filed on Jan. 5, 2018, and 62/620,981, filed on Jan. 23, 2018, the entirety which are incorporated herein by reference.

BACKGROUND

The present disclosure relates to power grid systems. In particular, a grid system designed to use slow rates of change in the current provided to systems connected to the grid and using those slow rates of change to enable rapid fault detection.

Electrical power is traditionally distributed to customers as AC because it is a simple and cost-effective method in centralized power production schemes. Conventional alternating current (AC) power grid systems use technology that is nearly 100 years old. The cost of implementing conventional AC power grid systems is based on commodities, such as copper, steel, aluminum, wood, and oil, that continue to increase in price.

Rapid improvements in cost and performance of photovoltaic (PV) technology, battery technology, and power electronics facilitate the development of DC power grid systems that can provide better efficiency, reliability, and safety at lower costs than AC power grid systems. The cost improvements can be obtained from the economic savings of using lower cost commodities, and from more active use of deployed equipment.

However, DC power grid systems have been slow to progress due to challenges concerning control and protection of DC power grids. DC power grid systems can respond to load/supply variations and fault conditions quickly relative to AC systems. This characteristic combined with time-varying supply and load configurations may result in DC power grid systems that are specially designed and include complicated control algorithms to maintain stability. Additionally, fault conditions on DC distribution networks may be a safety concern. For example, unlike AC distribution networks, the constant direct flow of current to a DC system fault can be difficult to interrupt using cost effective means.

By designing a system that works with slow rates of change, inductance may be added to the system to lower the di/dt of current, which makes the system safer and able to operate with hardware with lower current ratings (e.g., fuses). The slow rates of change may also enhance the stability of the system and enable the use of voltage signaling techniques that otherwise would be difficult on a system with random variations in system voltage.

Reliability of power distribution is a priority for the grid operators. The ability to quickly detect, isolate, and recover from faults in the distribution system is critical for the reliability of the system. The proliferation of distributed resources brings additional constrains to the system operation that have to be addressed to maintain and increase the reliability of the distribution system. Distribution systems use fuses and protection relays to isolate the different sections of the system in case of faults. When a fuse is blown because of overcurrent, service personnel have to be dispatched to the site to replace the fuse and restore the power service to those affected by the outage.

More advanced electronic protections based on measuring the current and disconnecting in case of a fault can be installed and coordinated to respond earlier than the fuse and allow easy restoration of power after a fault. These electronic protections may include fault distance estimation, wavelet transforms, and differential current. Because of the high cost, advance methods are mainly used in larger feeders with fuses being the preferred method to protect smaller laterals and service drops. Protections are located to minimize the number of customers affected by a fault. In addition, in some cases redundant paths of power distribution are provided for fast restoration of power while minimizing the number of customers affected by outages.

Traditional fault detection schemes include a balancing strategy that allows the system to react quickly to an imperfect match between the supply and load behavior by a voltage variation, which indicates a voltage imbalance, and thus a current imbalance. Traditional systems must tolerate a wide range of operating currents such that even in fault conditions it takes time for the system to determine that the current is abnormal and constitutes a fault. These traditional systems rely on a large energy flow to the fault to initiate protective action, creating a high chance for damage and safety concerns. In other words, the conventional overcurrent protections are activated by currents well above the nominal value of the line current, independently of the current being demanded by the load at any instant. This is because the system cannot anticipate sudden load changes and differentiate them from fault currents.

To accomplish these goals, the system can add communication between the supply and load networks, either through wired or wireless communication platforms. The wired communication platforms typically require independent hardware installed solely for the communication. These platforms require extra equipment, increasing the cost of the system. Wireless communication platforms also require additional hardware installed into the system and can be unreliable. Both systems require significant redesign every time a new network is created or added, further increasing the costs of providing or updating power networks.

As the power infrastructure changes by having more distributed generation and storage, new technologies are needed to take advantage of those resources and increase the reliability of the electric distribution system. This is even more important in DC distribution systems where different behavior results in the need for novel protection methods. For example, the current rise after a fault in a DC system is generally much faster than for AC systems requiring faster response from the protection methods as well as complicating the coordination of the protections. In addition, restoration of power in DC distribution systems is more difficult because of the large system capacitances that result in large inrush currents during re-energization and potentially in resonances and damage to equipment.

To supply power from a DC distribution system to an AC system, an inverter may be used. An inverter is a device that transforms an DC supply into an AC supply. Inverters accomplish this by using a switching operation, making the power flow in a wave rather than a direct path. The switching operation can range from a physical switch to a complex electrical circuit utilizing semiconductors to operate a switch.

Inverters also vary in the shape of AC supply wave they create. These AC supplies can be square waves, sinusoidal waves, or any other form of wave dictated by the controlling software of the inverter. Different applications can tolerate different types of power signals. For example, complex electronics are very sensitive to the shape of the power wave, requiring smooth, sinusoidal waves to prevent damaging the internal components. Large electronics, such as refrigerators and ovens, can tolerate more square waves without damaging their components.

Power grids must worry about faults. Faults can be dangerous for a number of reasons, including danger to persons in the area of the fault by causing electrocution that could lead to ventricular fibrillation. Several types of faults exist, including ground faults, high impedance faults, phase faults, pole to pole faults, arcing faults, intermittent pecking faults, voltage unbalance due to open neutral connections.

GFI faults are traditionally detected at the transformer with an external GFI device. This device passes two current carrying conductors of an AC supply through a common current transformer. Both currents induce a magnetic field in the current transformer core. When the currents are in a balanced flow condition (or no fault condition), the opposing currents induce magnetic fields that cancel each other out, resulting in zero output voltage on the current transformer secondary winding. When a ground fault occurs, a small amount of current is diverted into ground and appears as an imbalance in the current transformer, thus generating a secondary voltage which quickly operates the GFI circuit breaker.

SUMMARY

This application discloses a system that may comprise at least a portion of a supply network. The system may further comprise a load controller that controls current flow with a current level of $I_1$ into a load network that provides power to one or more loads from the at least a portion of the supply network according to a preprogrammed load curve. The system may also comprise a protection system that isolates the at least a portion of the supply network from the load controller in response to detecting a current pattern that is inconsistent with the preprogrammed load curve.

This application also discloses a system where the supply network is an DC network. This application also discloses a system where the supply network is an AC network. The system also discloses that the supply network may comprise a supply controller that maintains a supply voltage of the supply network.

The application also discloses a system where the supply network further comprises an energy storage, wherein the supply controller maintains the supply voltage using the energy storage. The system may also comprise the supply controller is configured to vary the supply voltage to send a communication pulse at a predetermined voltage or shape. The application also discloses a system where the load controller comprises a voltage sensor, a processor, and a memory, wherein the memory includes instructions that, when executed by the processor, cause the processor to extract the communication pulse from a power signal provided by the supply network using the voltage sensor. The application also discloses a system where the memory further comprises instructions that, when executed by the processor, process the communication pulse to determine a command issued to the load controller.

The system may also comprise the processor determines the command based on a length of time the supply voltage stays at the predetermined voltage. The system may also comprise the processor determines the command based on the shape of the power signal to or from the supply voltage. The system may also comprise the processor determines the command based on the rate at which the power signal transitions to the predetermined voltage.

The system may also comprise varying the supply voltage to send the communication pulse comprises changing the supply voltage from an initial level to the predetermined voltage at a rate slower than the normal transience of a distribution line in the supply network.

The system may also comprise the processor determines a start of the communication pulse based on detecting the change in the supply voltage to the predetermined voltage at the set rate.

The system may also comprise sending the communication pulse further comprises ending the communication pulse by changing the supply voltage from the predetermined voltage at a set rate. The system may also comprise the processor determines an end of the communication pulse based on detecting the change in the supply voltage from the predetermined voltage at a set rate.

The system may also comprise the supply controller is further configured to perform communication error correction by retransmitting the communication pulse if an expected response to a command communicated by the communication pulse is not detected within a time period.

The application also discloses a system where the load controller comprises a voltage sensor, a processor, and a memory, wherein the memory includes instructions that, when executed by the processor, cause the processor to detect a fault when the voltage sensor measures a supply voltage from the supply network that does not follow an expected pattern set by the source controller.

The system may also comprise an energy storage in the load network, and the load controller controlling the current flow comprises storing or drawing energy from the energy storage to keep the controlled current flow in accord with the preprogrammed load curve.

The application also discloses a system where the energy storage comprises a storage controller and an energy storage device, the storage controller controlling storage or draw of energy from the energy storage device. The system may also comprise the storage controller communicates with the load controller to adjust a position on the preprogrammed load curve based on the amount of energy stored in the energy storage device. The system may also be configured to where the energy storage device comprises a battery.

The system may also comprise the load controller changes levels on the preprogrammed load curve in response to demand of the one or more loads.

The application also discloses a system where the one or more loads comprises a building. The application also discloses a system where the one or more loads comprises an inverter.

The system may also comprise the inverter comprises a memory; a processor; and a circuit for converting DC power to AC power. The memory storage device may include instructions that, when executed by the processor, perform a method comprising receiving an output of the inverter, storing the output of the inverter for multiple points in time, analyzing the output of the inverter for multiple points in time to detect one or more faults, determining whether one or more of the detected faults requires the inverter to enter one or more protection modes, and issuing a command to cause the inverter to enter one of the one or more protection modes based on the determination.

The system may also comprise the protection system comprises a component that limits the rate of change of a fault current.

The application also discloses a system where the component is an inductor.

The application also discloses a system where the protection system comprises a protection device, the protection device comprising a current sensing unit that measures a current; a controller that compares current measurements from the current sensing unit to a predetermined pattern; and a fast disconnect that receives a signal from the controller to act when a pattern of the measured current is inconsistent with the predetermined pattern.

The system may also comprise comparing the current measurements from the current sensing unit to the predetermined pattern comprises comparing a ramp rate of the current measurements to a predetermined ramp rate. The system may also be configured to where comparing the ramp rate of the current measurements to the predetermined ramp rate comprises calculating the derivative of the current measurements.

The application also discloses a system where the fast disconnect comprises a solid-state device.

The system may also comprise detecting the current pattern that is inconsistent with the preprogrammed load curve is based on an observed ramp rate. The system may also comprise detecting the current pattern that is inconsistent with the preprogrammed load curve is based on a shape of the current pattern. The system may also be configured to where detecting the current pattern that is inconsistent with the preprogrammed load curve is based on a level of the current pattern.

The application also discloses a system where the load controller is a first load controller, the current level of $I_1$ into the load network is a first current level of $I_1$ into a first load network, and the preprogrammed load curve is a first preprogrammed load curve. The system may further comprise a second load controller that controls current flow with a second current level of $I_2$ into a second load network from the at least a portion of the supply network according to a second preprogrammed load curve. The application also discloses a system where the first preprogrammed load curve and the second preprogrammed load curve are the same. The application also discloses a system where the first preprogrammed load curve and the second preprogrammed load curve are different. The system may also comprise detecting the current pattern that is inconsistent with the preprogrammed load curve comprises detecting the current pattern is inconsistent with both the first preprogrammed load curve and the second preprogrammed load curve.

DETAILED DESCRIPTION

The present disclosure describes systems and techniques related to a power grid system that can detect and clear faults earlier than other alternatives while maintaining stable operation. In general, the power grid system can utilize local energy storage to limit spikes in demand from loads. This enables stable control over the load curves in the grid, which may then be used for fault detection based on variations from the expected load curve. This stabilized control may prevent nuisance trips that could otherwise be caused by spikes in load, such as the cycling of an air conditioner compressor. The technique has an increased value in DC grids where the dynamics of the system results in added complications for fault detection and interruption. Nevertheless, AC grids may also benefit by providing early detection of faults, preventing blowing of fuses or tripping of circuit breakers, increasing reliability by enabling quick restoration of the power after a fault, as well as other benefits.

For a DC grid, the described systems and techniques can be implemented so as to realize one or more of the following advantages. Embodiments of a DC power grid system described in this specification are lower in cost and more reliable than AC power grid systems. Relative to AC power grid systems, embodiments of a DC power grid system described in this specification provide an easier interface or connection to renewable DC energy sources such as a PV system. Embodiments of a DC power grid system described in this specification provide for DC configurations at load points, which enables the conversion of appliances and other loads to DC. Effectively modular configurations of a DC power grid system can allow for easier underground installation and lower skilled labor, and require less or no customization for each application. Embodiments of a DC power grid system described in this specification provide inherently safer operation of the DC power grid that can be achieved due to switching speed and programmable load behavior of power electronics in combination with distributed energy storage. Embodiments of a DC power grid system and associated modular fail-safe designs can eliminate the complexity of many components of the AC power grid system and variations in power line frequency, which may allow international consistency.

To facilitate effective communication, the invention also includes a pulse signal communication platform that allows the network to communicate by sending a pulse signal where the voltage of the supplied power is set to a communicating voltage using a slow ramp up and ramp down of the voltage to a specified communicating voltage to indicate the pulse is a communication signal.

Hardware Overview

Figure 1:
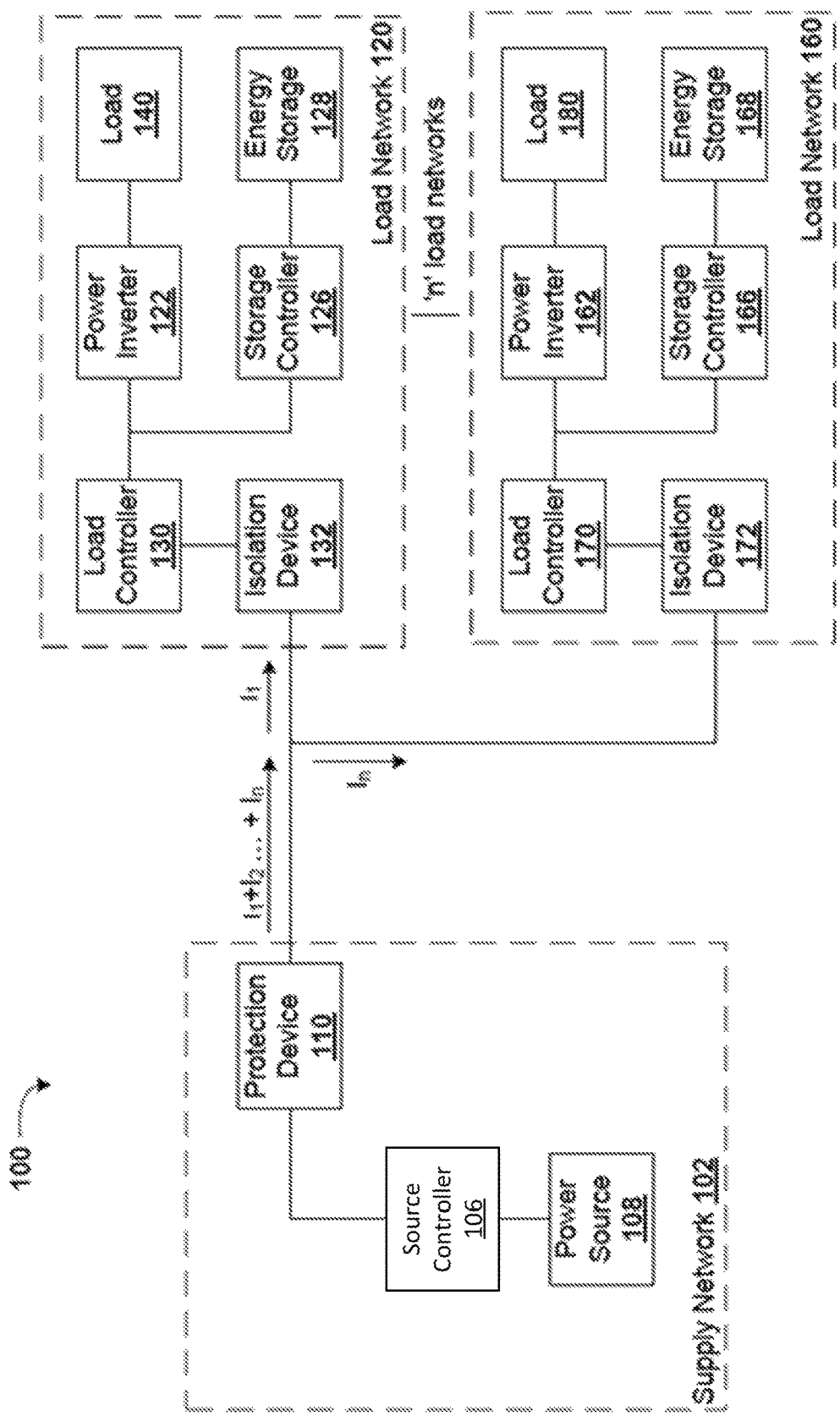
FIG. 1 is a block diagram showing an example of a power grid system.

FIG. 1 is a block diagram showing an example of a power grid system 100 that can detect and clear faults while maintaining stable operation and supplying power to load networks. For example, when the power grid is a DC power grid, system 100 may be implemented as a stand-alone distribution network with electrical energy being supplied by renewable and/or backup power generation sources and energy storage devices. The DC power grid system 100 may be configured as a last mile application replacing existing AC power grid systems and providing better reliability while reducing peak AC system loading and avoiding generation or line capacity additions. The DC power grid system 100 may deliver electrical energy over long distances and with higher levels of public exposure relative to typical DC applications which are usually enclosed or contained within a building. By exploiting the use of energy storage devices and the programmability of power controllers, the DC power grid system 100, with the storage and the controlled flows, may provide a distribution system that operates safely in and around public areas. Intelligent use of energy storage devices, e.g., battery storage and the programmability of power controllers may overcome limitations of conventional DC distribution systems relating to system stability and fault detection, fault clearing, and system control.

Supply Network

The DC power grid system 100 includes a supply network 102 and one or more load networks, for example load networks 120 and 160. The supply network 102 is connected with the load networks 120 and 160 by a DC distribution circuit (not shown) having various possible voltages and configurations. Within the supply network 102 and load networks 120 and 160 are converters that may have various configurations and may operate with various supply and load shaping algorithms and preprogrammed curves, which will be described in more detail below. In the illustrated embodiment of FIG. 1, the supply network 102 is shown delivering electrical energy with a current level of $I_1+I_2+\ldots+I_n$ to the load network. Although one supply network 102 and two load networks 120 and 160 are shown for purposes of explanation, the DC power grid system 100 may include more than one supply network and/or one or more load networks. In some embodiments, a load network may transform and act as a supply network, which is enabled through bidirectional converters, local energy sources, and/or local energy storage. In some embodiments, the load network may be provided with a protection system equivalent to the protection device 110 in the source network 102 giving it the full functionality of a source network.

The supply network 102 may include a power source 108 that generates power. The power source 108 may include, for example, a PV system that employs a solar panel array to generate DC electrical power, a hydroelectric power system that employs water turbines to generate DC electrical power, a wind farm that employs wind turbines to generate DC electrical power, a distributed natural fossil fuel generation system, a battery source, and/or an AC grid through a rectifier. The power source 108 may include a main power source (e.g., the PV system) and a backup power source (e.g., the hydroelectric power system, the wind farm, the distributed natural fossil fuel generation system, other DC grid systems, and/or the AC grid through the rectifier). In some implementations, the power source 108 also includes one or more batteries of appropriate size(s).

The supply network 102 may include a source controller 106 and a protection device 110, which may be an independent device or part of another device such as a supply controller. In some implementations the source controller 106 includes a charge controller that regulates the rate at which electric current is added to or drawn from the power source 108 to regulate the network voltage. The source controller 106 may include a maximum power point tracker (MPPT) that optimizes a match between the sources of power within power source 108. In some implementations, the power source 108 comprises an AC system or additional DC networks of sufficient size (e.g., an AC power grid system). The source controller 106 may include a power inverter that converts excess DC power in the load network to supply AC power back to the AC system of sufficient size. In such implementations, the system may operate with storage at the supply other than the AC system of sufficient size. The source controller 106 and the power source 108 may be a single integrated unit or two or more separate units. The protection device 110 may be a power converter such as a DC-to-DC converter. The protection device 110 may be integrated with the source controller, it could be independent, or several protection devices could be distributed along the network.

The supply network 102 may employ the back-up power sources in power source 108 to supply power at predictable levels. The supply network may act as a voltage source to the load networks 120 and 160. The supply controller may ensure that the voltage in the network is controlled and/or it may ensure that any level of current required to maintain voltage constant or ramping and in accordance with a preprogrammed load curve is supplied. In this instance, the load curve may be a voltage curve. The amount of current required to maintain the voltage profiles is predictable so small variations of the current needed to provide the voltage profiles indicate a network fault. Similarly, the protection device 110 can monitor the rate of change for the current and/or the level of current to determine when a network fault occurs. The rate of change measured using a number of techniques. For example, it may be measured using an algorithm that calculates the derivative of the current signal. Alternatively, it may be measured using one or more circuits for measuring the rate of change for the current.

The power source 108 may allow independent load networks to control the current flow with a level of $I_n$ from the supply network 102 according to a preprogrammed load curve. For example, the power source 108 may provide additional DC power flowing through the at least a portion of protection device 110 during peak power consumption periods, low power production periods, and/or unanticipated power demands. Additionally, the power source 108 may receive excess DC power provided by other elements in the supply network 102 during high power production periods and/or during low power consumption periods, and the power source 108 may also receive power from the load networks 120 and 160.

Figure 11:
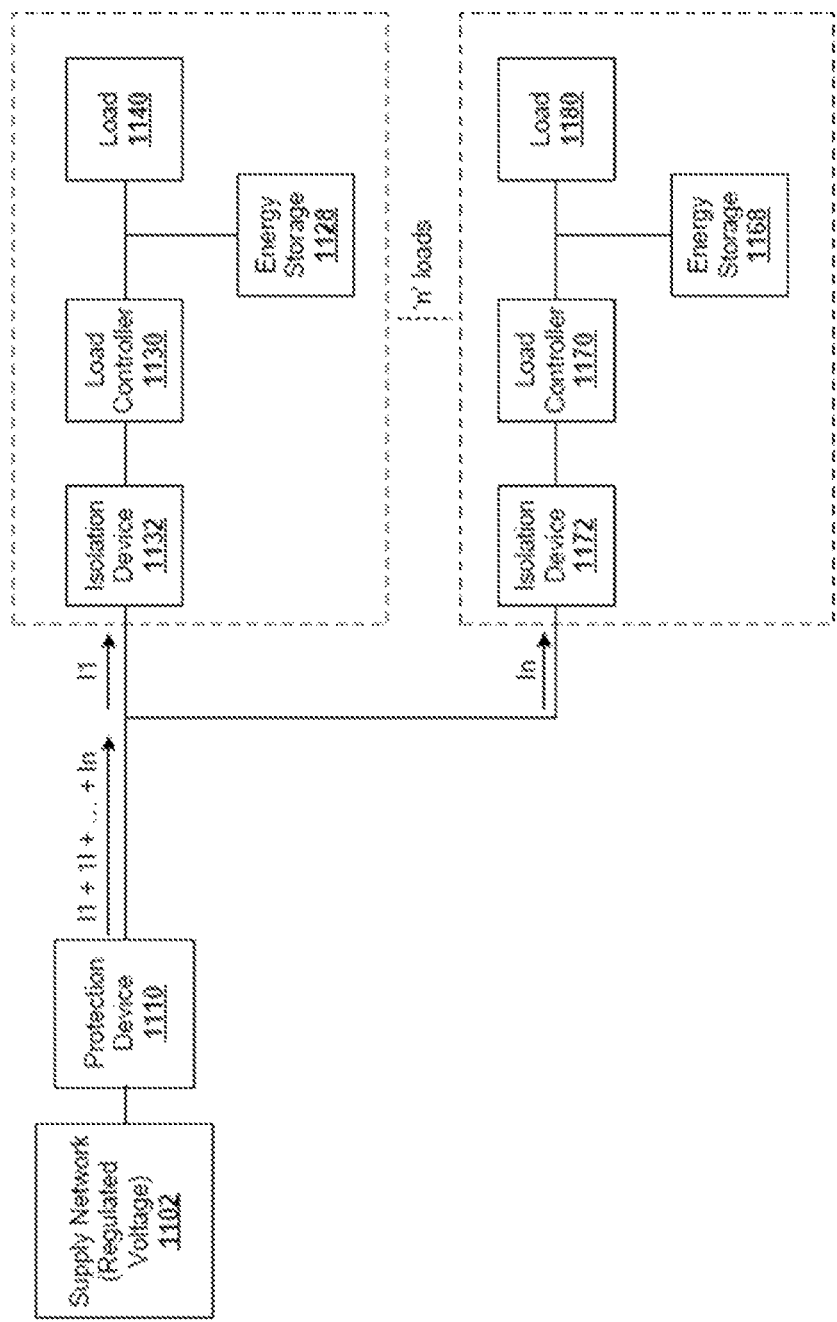
FIG. 11 is a block diagram showing an example of a power grid system.

In some embodiments, such as the one in FIG. 11, the supply network 1102 can be generalized to have a protection device 1110 between the supply network 1102 and the load networks. Supply network 1102 may operate in a manner similar to that described above for supply network 102.

Figure 12:
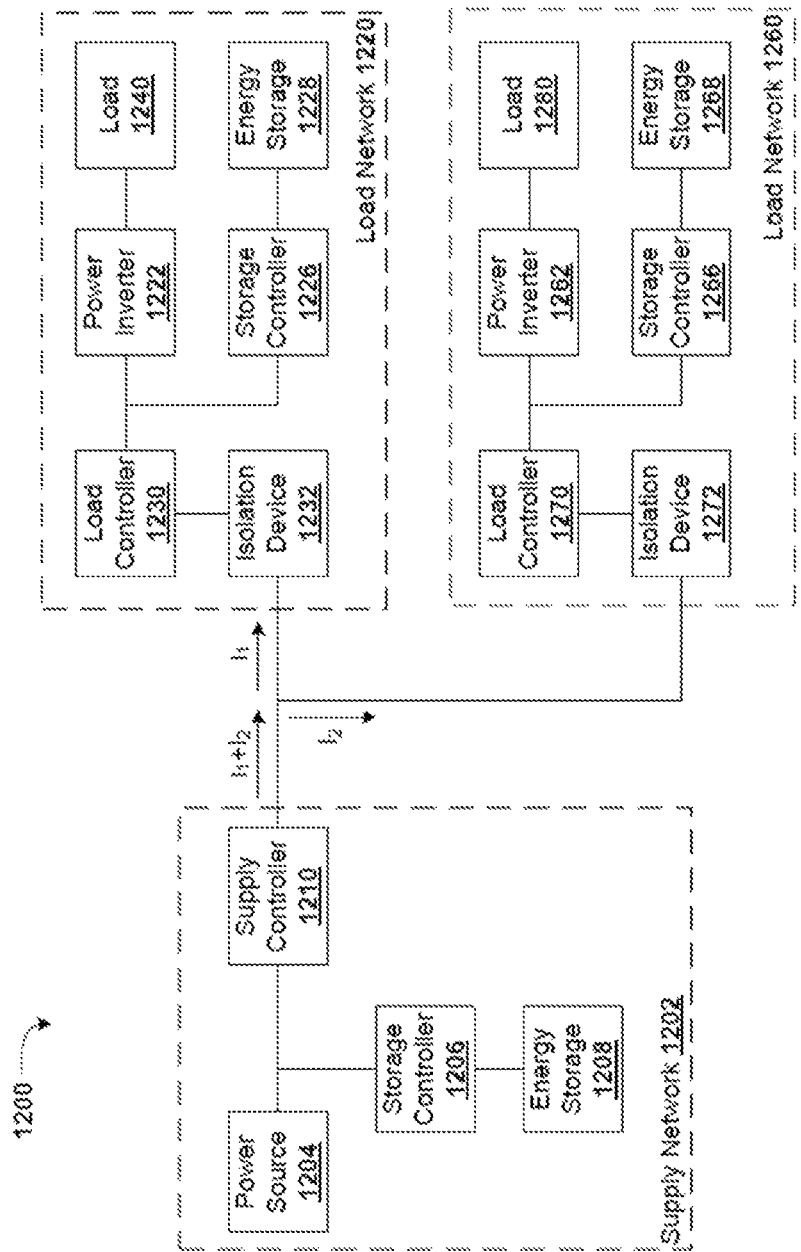
FIG. 12 is a block diagram showing an example of a power grid system.

In some embodiments, such as the one in FIG. 12, the supply network 1202 includes a power supply 1204, a storage controller 1206, an energy storage 1208, and a supply controller 1210. The power supply 1204 and energy storage 1208 may operate in a manner similar to that described above for the power source 108. Similarly, the storage controller 1206 may operate in a manner similar to that described above for source controller 106. Additionally, supply controller 1210 may coordinate with energy storage 1208 to supplement the power from power supply 1204 and maintain the supply voltage at a desired level. Supply controller 1210 can contain a protection device that operates in a manner similar to that described herein for the protection devices 110 and 700. The supply controller 1210 may also perform other functions known in the art to regulate the power, voltage, and current that flows between the supply network 1202 and the load networks 1220 and 1260.

Load Networks

The load network 120 may include a storage controller 126, an energy storage unit 128, and a load controller 130. In some implementations, storage controller 126 may be optional. In some implementations, the energy storage unit 128 includes one or more batteries of appropriate size(s), and the storage controller 126 includes a charge controller that controls the rate at which electric current is added to or drawn from the energy storage unit 128. The storage controller 126 may be used by the load controller 1130 to limit the rate of change in the load network 120 slowly enough that the change can be differentiated from other transience that occurs during normal operation of the system. The rate of change used may depend on the capabilities of the system. The storage controller 126 and the energy storage unit 128 may be a single integrated unit or two or more separate units. The load controller 130 may be a power converter such as a DC-to-DC converter. The storage controller 126 may also communicate with the load controller 130 to adjust a position on the preprogrammed load curve based on the amount of energy stored in the energy storage unit 128. In this way, the storage controller 126 may operate to prevent the energy storage unit 128 from being fully charged or discharged, which would inhibit the ability of the load controller 130 from keeping the current drawn by the load network 120 in compliance with the preprogrammed load curve. The load controller 130 may also be connected to one or more other devices such as a photovoltaic power sources, a generator, etc.

Figure 13:
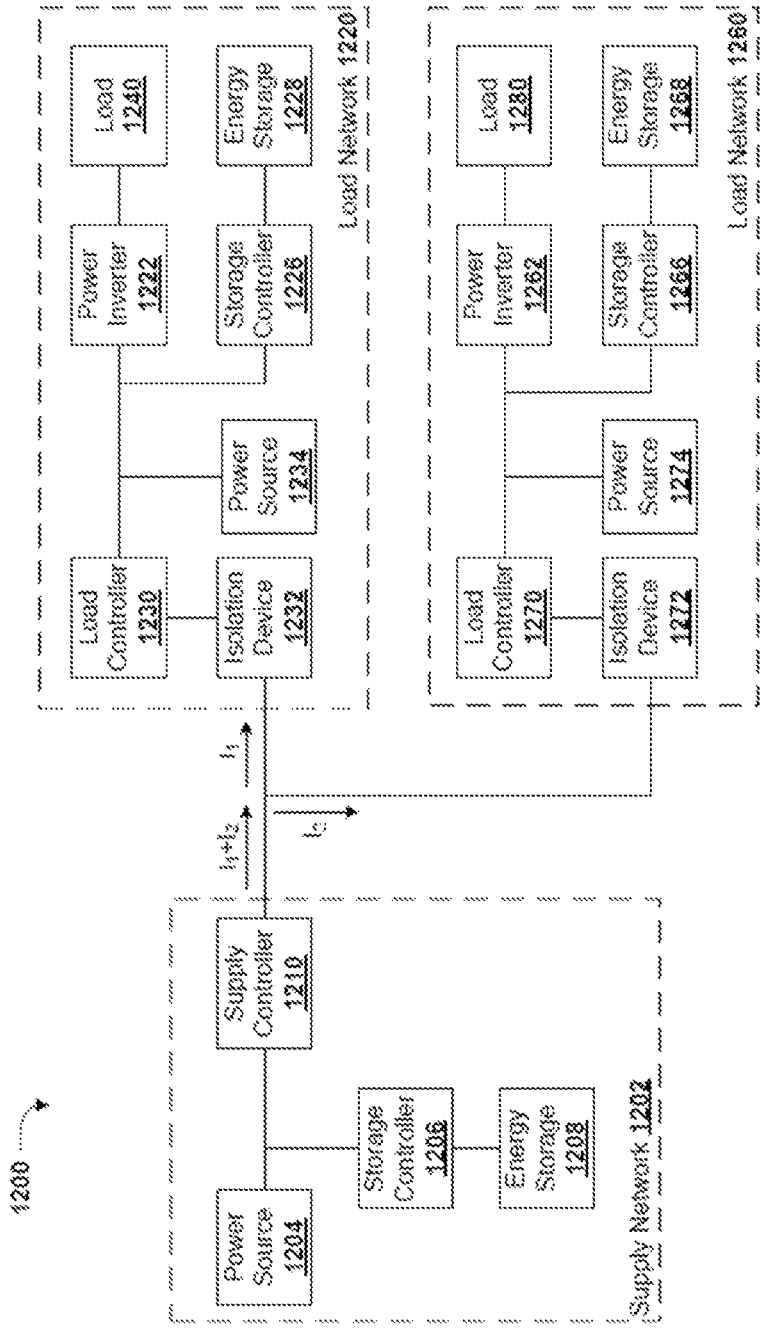
FIG. 13 is a block diagram showing an example of a power grid system.

The load network 120 may employ the energy storage unit 128 and load controller 130 to maintain power flow at stable levels. The energy storage unit 128 may supplement the current flow to maintain a current level of $I_1$ into the load network 120 according to a command from load controller 130 based on a preprogrammed load curve. For example, the energy storage unit 128 may provide additional DC power to the load 140 during peak power consumption periods, low power supply periods, and/or unanticipated power demands. Load 140 may be a single load or multiple loads. The energy storage unit 128 may also receive excess DC power provided to the load network 120 that is not used by the load 140. In some implementations, the load controller 130 requests power from the supply network 102 to provide constant low power flows for charging of the energy storage unit 128 in addition to satisfying the demand of the load 140. For example, trickle charging or other suitable techniques may be used. In general, the various capabilities of the supply network 102 (e.g., power supply, controller, and energy storage device) and the various capabilities of the load network 120 (e.g., controller and energy storage device) allow the current flowing across the system to be as constant and low as possible. In yet other implementations, as shown in FIG. 13, other sources of power 1234 and 1274, such as a photovoltaic generator or a conventional power generator, could be connected to the load network. FIG. 13 is similar to FIG. 12, but has the power sources 1234 and 1274 added to the load networks.

Similarly, the load network 160 may include a storage controller 166, an energy storage unit 168, and a load controller 170. In some implementations, storage controller 166 may be optional. In some implementations, the energy storage unit 168 includes one or more batteries of appropriate size(s), and the storage controller 166 includes a charge controller that limits the rate at which electric current is added to or drawn from the energy storage unit 168. The storage controller 166 limits the rate of change in the load network 160 slowly enough that the change can be differentiated from other transience that occurs during normal operation of the system, such as when devices are added or turned on. The rate of change used will depend on the capabilities of the system. The storage controller 166 and the energy storage unit 168 may be a single integrated unit or two or more separate units. The load controller 170 may be a power converter such as a DC-to-DC converter. The load network 160 may also be connected to one or more other devices such as a photovoltaic power source, a generator, etc.

The load network 160 may employ the energy storage unit 168 to maintain power flow at stable levels. The energy storage unit 168 can be a battery or other means of storing energy. The energy storage unit 168 may supplement the current flow to maintain a current level of $I_2$ into the load network 160 according to a command from load controller 170 based on a preprogrammed load curve. For example, the energy storage unit 168 may provide additional DC power to the load 180 during peak power consumption periods, low power supply periods, and/or unanticipated power demands. The energy storage unit 168 may also receive excess DC power provided to the load network 160 that is not used by the load 180. In some implementations, the load controller 170 may request power from the supply network 102 to provide constant low power flows for trickle charging of the energy storage unit 168 in addition to satisfying the demand of the load 180. Additionally, in some implementations, the energy storage unit 168 may also supply power to the supply network 102. In general, the various capabilities of the supply network 102 (e.g., power supply, controller, and energy storage device) and the various capabilities of the load network 160 (e.g., controller and energy storage device) may allow the flows across the system to be as constant and low as possible.

In some embodiments, such as the one in FIG. 11, the load networks can be generalized to have isolation devices 1132 and 1172, load controllers 1130 and 1170, energy storage 1128 and 1168, and loads 1140 and 1180. Each of these may operate in a manner similar to that described above for isolation devices 132 and 172, load controllers 130 and 170, energy storage 128 and 168, and loads 140 and 180, respectively. Not shown in FIG. 11 are the equivalents of power inverters 122 and 162 and storage controllers 126 and 166. In some embodiments, the loads may be DC powered requiring a DC/DC converter instead of the mentioned inverters 122 and 162. As described herein, some embodiments may include those features while others do not. Similar to the description for these features in FIG. 1, some embodiments based on the load networks in FIG. 11 may include power inverters or storage controllers that operate in a manner similar to the ones described above.

In some embodiments, such as the one in FIG. 12, the load networks 1220 and 1260 include isolation devices 1232 and 1272, load controllers 1230 and 1270, power inverters 1222 and 1262, storage controllers 1226 and 1266, energy storage 1228 and 1268, and loads 1240 and 1280. Each of these may operate in a manner similar to that described above for isolation devices 132 and 172, load controllers 130 and 170, power inverters 122 and 162, storage controllers 126 and 166, energy storage 128 and 168, and loads 140 and 180, respectively.

Connecting the Supply Network and Load Network

In a system with many load networks, each load network may be assigned a priority to access the supply network so that not all loads are ramping demand at the same time. This network management may be accomplished using, for example, a token ring communication coupling the supply and load networks and/or an embedded sensing and activation method at each load network that senses voltage changes on the system and monitors the activity on the system to determine the load network's turn to activate. During times when a load network is waiting to access the supply network, the load network may access local energy storage. In a system with many supply networks, the supply networks may be similarly configured so that not all supplies are providing power at the same time.

In the embodiment illustrated in FIG. 1, the load network 120 services a load 140. The load 140 may include loads of a building or other structure, which typically includes, for example, lighting, ventilation fans, appliances, and other electronic devices. The load 140 may also be a building itself. In some implementations, the load 140 may include an electric vehicle charger. Additionally, the load 140 may include DC loads such as batteries deployed at load points (e.g., at the electric vehicle charger), or an oven or heat pump. If the load 140 includes an AC load, the load network 120 may include a power inverter 122 that converts the DC power provided by the supply network 102 to AC power for the AC load. The controlled flow and protection techniques described herein may also be applicable to higher energy applications where the end load is variable. In particular, similar controlled DC distribution may be used inside homes or businesses where batteries are installed to serve a single appliance to remove random load variations, causing the system to resemble a smaller version of the network 100 described. This allows higher energy application within the homes or businesses to use similar DC power control and protection techniques described in this specification. Similarly, the pulse communications described in this specification can also be included in these smaller implementations such as when the network principles are applied to a single appliance.

Similar to load network 120, the load network 160 services a load 180. The load 180 may include loads of a building or other structure, which typically includes, for example, lighting, ventilation fans, appliances, and other electronic devices. The load 140 may also be a building itself. In some implementations, the load 180 may include an electric vehicle charger. Additionally, the load 180 may include DC loads such as batteries deployed at load points (e.g., at the electric vehicle charger), or an oven or heat pump. If the load 180 includes an AC load, the load network 160 may include a power inverter 162 that converts the DC power provided by the supply network 102 to AC power for the AC load. The controlled flow and protection techniques described herein may also be applicable to higher energy applications where the end load is variable. As previously described, similar controlled DC distribution may be used inside homes or businesses where batteries are installed at the appliance level to remove random load variations. This allows higher energy application within the homes or businesses to use similar DC power control and protection techniques described in this specification.

Figure 2:
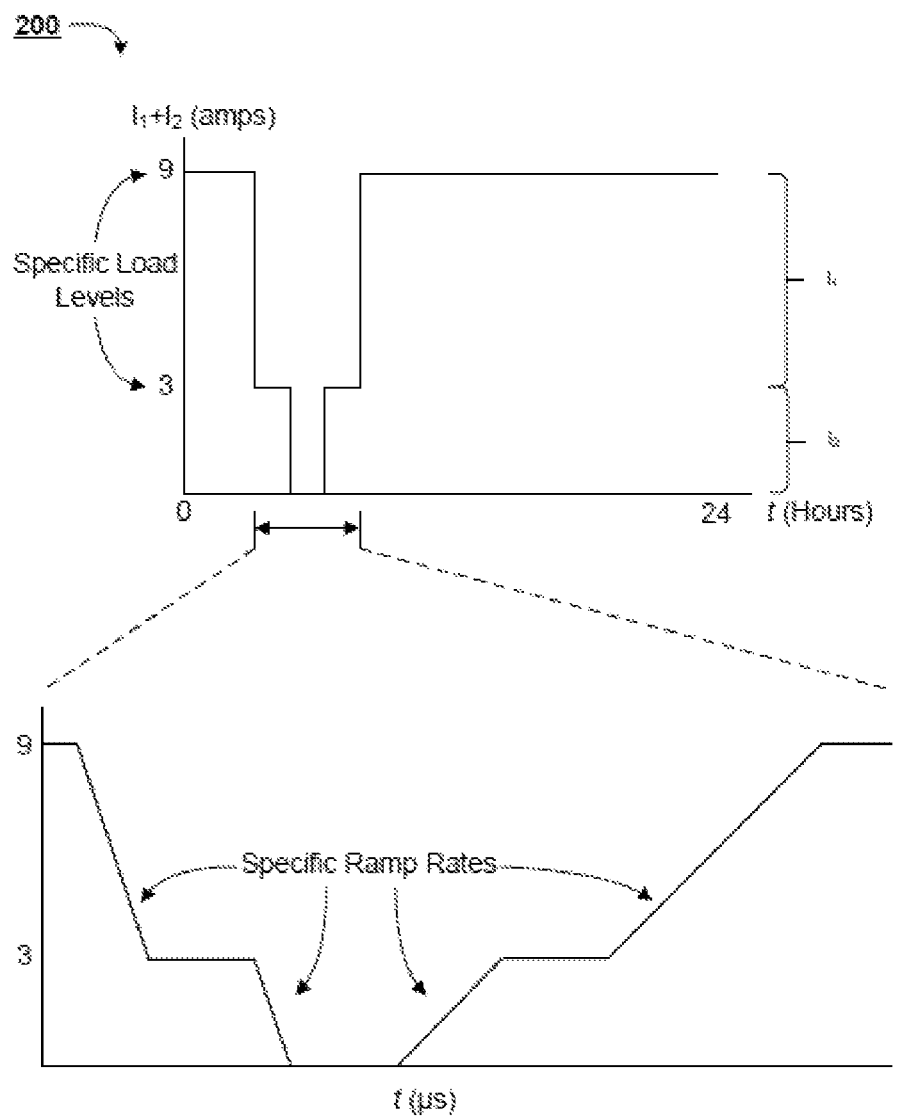
FIGS. 2-4 are preprogrammed load curves for various supply and load controllers of the DC power grid system of FIG. 1.
Figure 3:
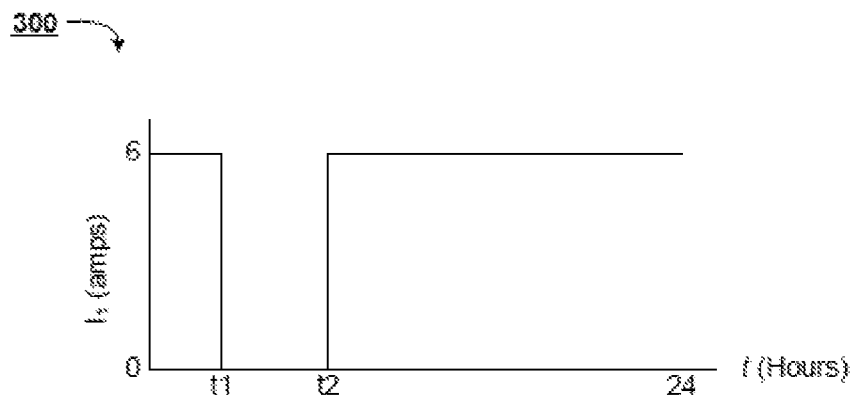
Figure 4:
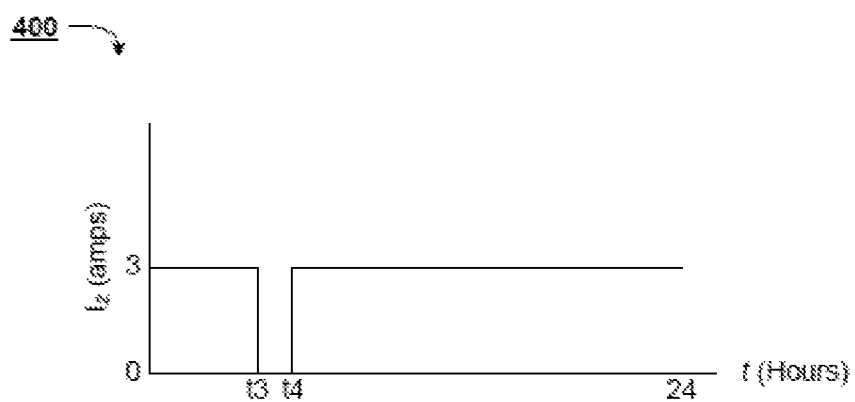

As previously explained, the source controller 106 may be programmed to maintain the system voltage by supplying current to the load networks 120 and 160 in accordance with the maximum load levels and ramp rates specified by the preprogrammed load curve 200. The load controllers 130 and 170 may be constant current devices that request current from the supply network 102 in accordance with the respective load levels and ramp rates specified by the preprogrammed load curves 300 and 400. The protection device 110 may be programmed with a supply behavior that is shaped and matched to the accumulated load behaviors programmed in the load controllers 130 and 170 resulting in a limit load curve similar to 200. As shown in FIGS. 2-4, the portion of the preprogrammed maximum load curve 200 between specific current levels, e.g., 3 and 9 amps, may be compared and matched to the measured load curve that includes the current $I_1$ used by load controller 130 of the load network 120 and that follows the preprogrammed load curve 300. The values of 3 and 9 amps are exemplary, other value may be more appropriate depending on the particular application and conditions. The portion of the maximum preprogrammed load curve 200 between specific load levels 0 and 3 may be compared and matched to the measured load curve that includes the current $I_2$ used by load controller 170 of load network 160 and that follows the preprogrammed load curve 400. The preprogrammed expected curve 200 may take in account conditions where both $I_1$ and $I_2$ are changing simultaneously. This strategy may enhance the performance of the system and may provide a protection system that reacts faster to fault conditions.

Load Curves

The control of the loads is designed to use the energy storage in the load networks to manage the load or supply variations to the load network. This allows the load controller to maintain a known current through current levels and ramp rates, known as load curves which are preprogrammed into the network. These preprogrammed load curves allow protective elements or devices to sense, through current and/or voltage, that the system is within the acceptable operation conditions. For example, the worst case scenarios of ramp rate and/or current levels may be determined based on the preprogrammed load curves from each of the load networks. By imposing limits or ramp shapes on the system, the system can ensure a relatively small rate of change.

Supply Network (First) Preprogrammed Load Curve

Figure 14:
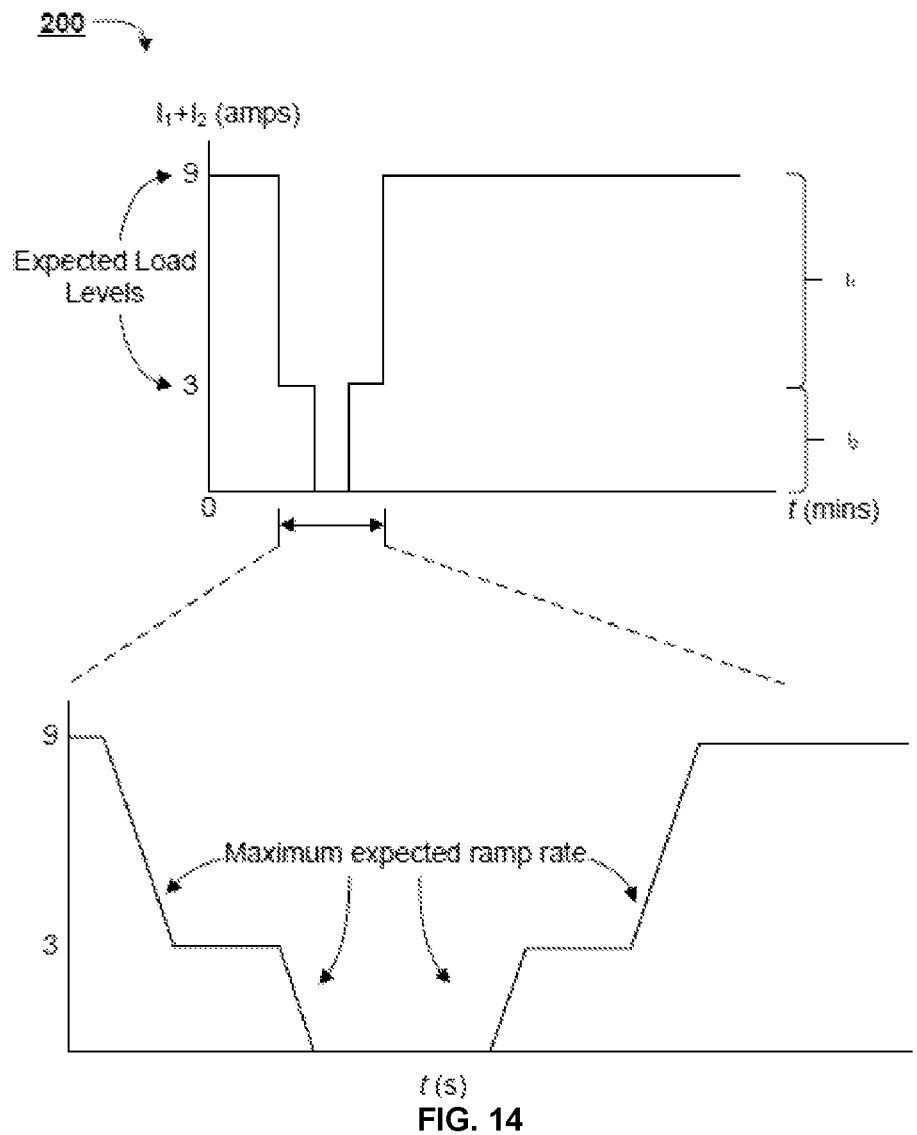
FIGS. 14-16 are preprogrammed load curves for various supply and load controllers of the DC power grid system of FIG. 1.

FIGS. 2 and 14 show examples of a preprogrammed worst case expected load curve 200 that may be used by the protection device 110 to compare with the measured power flow from the supply network 102. The preprogrammed load curve 200 represents anticipated total usage by the load networks 120 and 160 that should not be exceeded under non-faulted operation. The preprogrammed load curve 200 specifies protocols following specific ramp rates and strategic current ranges (also referred to as specific load levels) for providing current to the load networks 120 and 160. The expected preprogrammed load curves are independent of the random currents provided by the regulated power source 108. Currents supplied by the supply network may be managed in part by the power source 108 by compensating for fluctuations in the demand by the load networks. When currents to, and from, the load networks are managed and predictable, the system voltage can be precisely maintained and the fluctuations can be pre-estimated.

Controlling the voltage and current variations on the networks may allow the network to quickly determine when the voltage or current changes quicker or slower than designed. Sensing these abnormalities may enable the network to detect a number of problems including bad connections or arcing faults, which traditional fault detection systems cannot detect. For example, the protection device 110 may be programmed to respond to changes in supply levels by comparing the current supplied with one or more specified expected load curves 200.

Load Network (Second) Preprogrammed Load Curve

Figure 15:
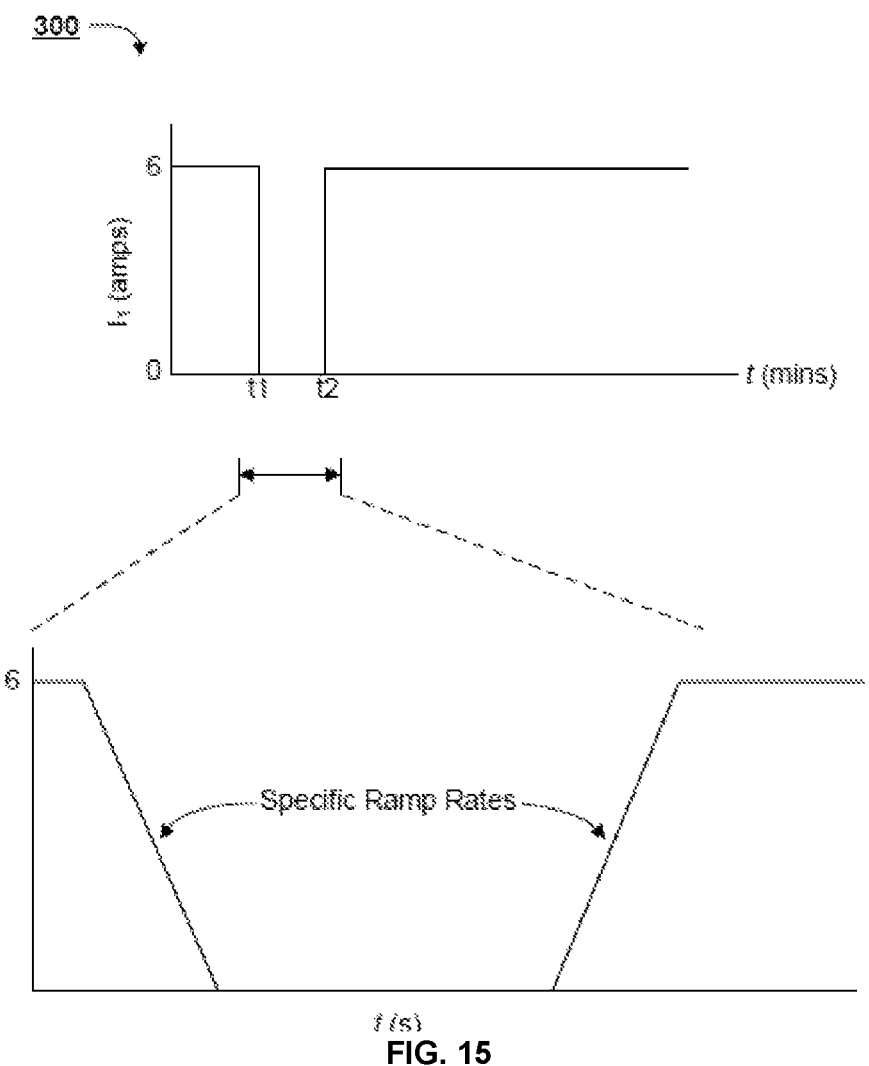

FIGS. 3 and 15 show examples of a preprogrammed load curve 300 that may be used by the load controller 130 to draw current from the supply network 102. The preprogrammed load curve 300 is based on usage by the load 140 and changes by specific amp increments with specific ramp rates. The preprogrammed load curve 300 specifies protocols following specific ramp rates and in some cases strategic current setpoints (also referred to as specific load levels) for receiving current from the supply network 102, which may be independent of the random currents provided by the power source 108 and required by the load 140. The load controller 130 may be a constant current device such that when the load requires changes in power, the power is provided or absorbed by the energy storage unit 128 so that the supply network can ramp to the new appropriate setpoint. The energy storage unit 128 in combination with the storage controller may reduce variation in the currents demanded by the load network by compensating for fluctuations in the power demanded by the load 140. Additionally, the energy storage unit 128 may provide the power demanded by the load 140 between the times t1 and t2, during which the load controller 130 is not requesting current from the supply network 102. When current from the supply network 102 to the load network 120 is managed and predictable, the system voltage may be precisely maintained with enhanced stability.

The load controller 130 may act as a constant current load at its various setpoints. For example, the load controller 130 may be configured to request 6 amps from the supply network 102 over a wide range of DC network voltages. As other loads ramp up, the voltage drops on the system, which typically increases all load currents. To maintain constant power to the load, the current may remain constant as the additional power to the load 140 is extracted from the energy storage unit 128. In this system design, the load is seen as a constant current or a known ramping current to a new setpoint. The actual current drawn from the supply network 102 by the load controller 130 may be determined by a process that senses a set of parameters such as the draw of the load 140, the state of charge of the energy storage unit 128, and the time of day. In some cases, the load controller 130 may request from the supply network 102 a high current supply as it exercises a strategy to meet the load demand and reinstate the battery charge to a high level in anticipation of a future time where the system may not be available to deliver current at a high level.

Figure 16:
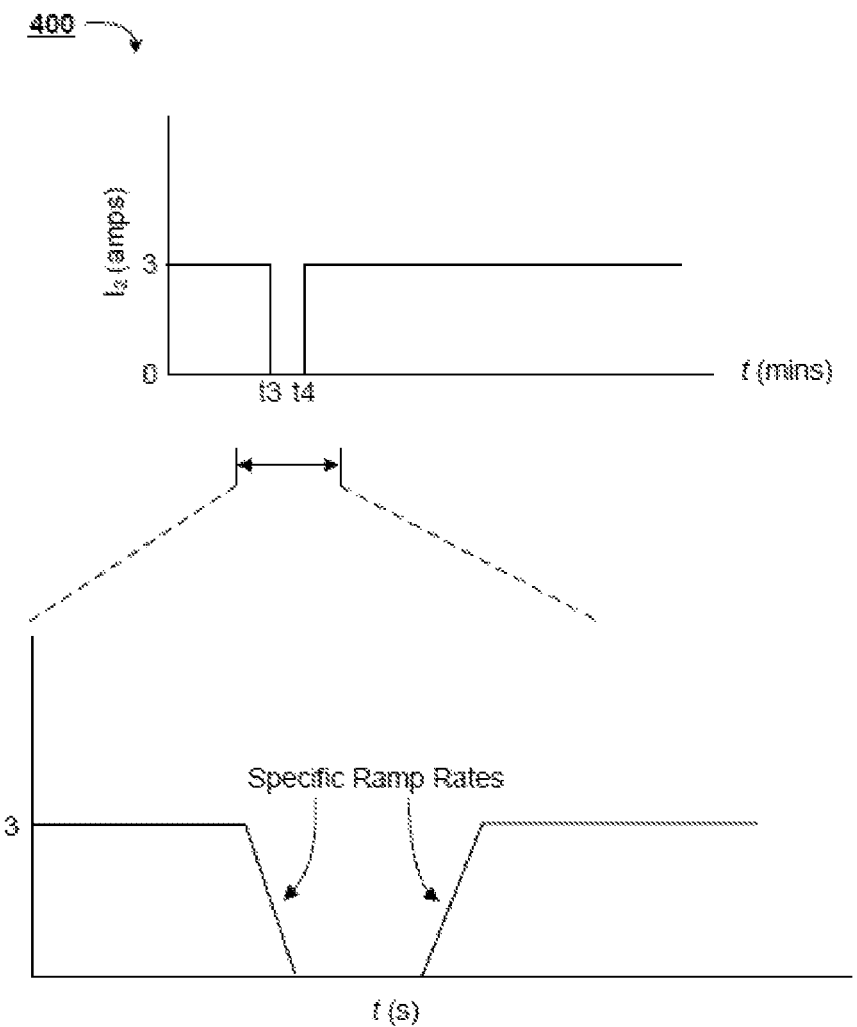

FIGS. 4 and 16 show examples of a preprogrammed load curve 400 that may be used by the load controller 170 to manage power flow into the load network 160. The preprogrammed load curve 400 is based on the usage by the load 180 and changes by specific amp increments with specific ramp rates. Further, the preprogrammed load curve 400 may be the same or different from preprogrammed load curve 300 based on the needs of loads 140 and 180. The preprogrammed load curve 400 specifies protocols following specific ramp rates and in some cases strategic current setpoints (also referred to as specific load levels) for receiving current from the supply network 102 which are independent of the random currents provided by the power source 108 and required by the load 180. The load controller 170 may be a constant current device such that when the load requires changes in power, the power is provided or absorbed by the energy storage unit 168 so that the supply network can ramp to the new appropriate setpoint. The energy storage unit 168 and the storage controller 166 may manage variation of the currents received by the load network 160 by compensating for fluctuations in the power demanded by the load 180. Additionally, the energy storage unit 168 may provide the power demanded by the load 180 between the times t3 and t4, during which the load controller 170 is not requesting current from the supply network 102. When current from the protection device 110 to the load network 160 are managed and predictable, the system voltage may be precisely maintained.

The load controller 170 may act as a constant current load at its various setpoints. For example, the load controller 170 can be configured to request 3 amps from the supply network 102 over a wide range of DC network voltages. As other loads ramp up, the voltage drops on the system, which typically increases all load currents. In this system design, the load may be seen as a constant current or a known ramping current to a new setpoint. The actual current drawn from the supply network 102 by the load controller 170 may be determined by an algorithm that senses a variety of parameters such as the draw of the load 180, the state of charge of the energy storage unit 168, and the time of day. In some cases, the load controller 170 may request from the supply network 102 a high current supply as it exercises a strategy to meet the load demand and reinstate the battery charge to a high level in anticipation of a future time where the system may not be available to deliver current at a high level.

Pulse Signal Communication Platform

Figure 5:
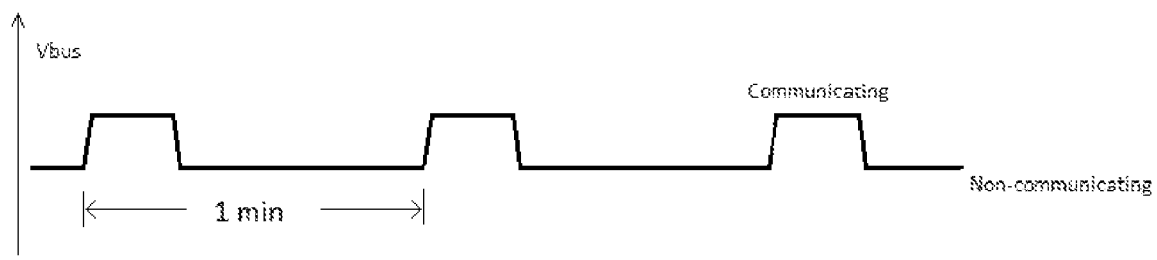
FIG. 5 is an example of a pulse communication control scheme.

To communicate between the supply network and the load networks, the supply network may use controlled voltage pulses where the ramp rate, level, or combination of the two (i.e. the shape of the change) of that voltage, is used to trigger specific events in the load network, such as switching hardware on or off, adjusting power consumption, or limiting power production. The pulses can also communicate other information such as weather data, system setpoints, and other messages. By utilizing the already present power lines, the pulse signal communication platform may reduce the need for extra equipment and increases the reliability of the communication platform. So long as power is being transmitted, the system may be able communicate. In one possible plug-and-play control scheme, the commands are not addressed to a specific element on the system but broadcasted to all the elements that respond based on the broadcasted message. One example of such a control scheme is shown in FIG. 5. Alternatively, device specific commands may be sent using a series of pulses. For example, a first pulse or set of pulses may address the device followed by an additional pulse or pulses to communicate the command or information directed to the identified device. An initial pulse identifying a communication as device specific or as a broadcast communication may also be used.

To send a pulse, the supply network may use regulating elements, such as source controller 106, to slowly increase the voltage in the power line from an initial level to a predetermined voltage, or communicating voltage, that the load network knows indicates the change in voltage is a message. While the examples herein use an increase in voltage as an example, decreases in voltage may also be used. The load network then uses the non-regulating elements to receive and decode the communicating voltage. The non-regulating elements may include the protection device 110, the load controllers 130 and 170, or discrete devices such as voltage sensors that allow the non-regulating elements to receive and measure the voltage changes. For example, the voltage sensor, processor(s) and memory device(s) necessary to receive and decode the pulse may be included in the load controllers 130 and 170. After receiving and measuring these changes, the non-regulating elements use a set of pre-programmed instructions to decode the signal.

In one embodiment, the communications may be sent using slow pulses with durations of hundreds of milliseconds or a few seconds. By using slow pulses instead of high frequency signals the interference coming from power conversion equipment and resonances and delays created by long transmission line effects are eliminated. Furthermore, the use of low frequency pulses enables transmitting the information for long distances not achieved with high frequency pulses. These slow pulses may be any value slower than the normal operation of the system, such as turning on or connecting devices. For example, a slower pulse may be 10 times slower or 100 times slower than the normal operation depending on the capabilities of the system to reliably control the normal operation of the supply to the loads.

In one embodiment, decoding the signals consists of measuring how long the voltage is set to the communicating voltage. In this embodiment, different lengths of time the system stays at the communicating voltage would indicate different commands or messages. For example, one length of time may mean to switch the device on or off, a second length of time may instruct the load network to limit power consumption. Similarly, commands or messages may also be communicated through the shape of the pulse in the voltage or current, or through the ramp rate of the voltage or current.

Figure 6:
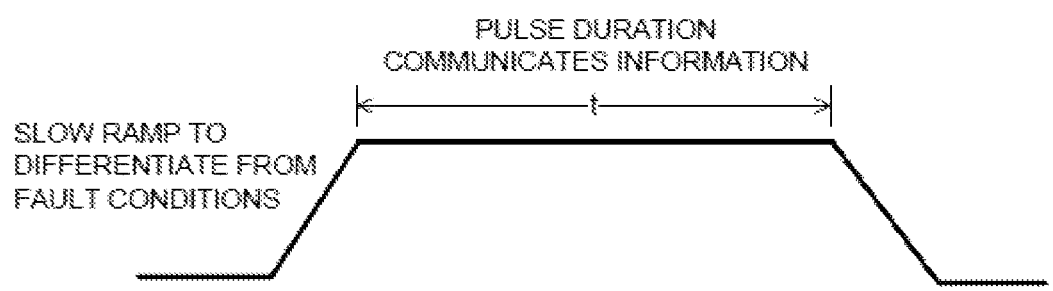
FIG. 6 is an example of a communication pulse.
Figure 17:
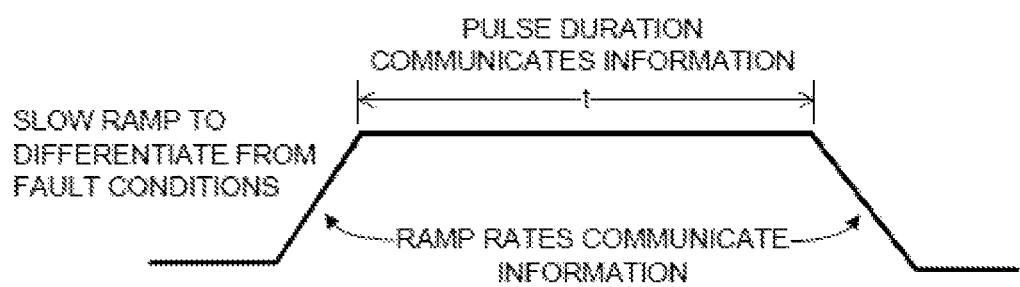
FIG. 17 is an example of a communication pulse.

Other conditions, such as a fault, may also cause the voltage to reach the communicating voltage. To prevent the non-regulating elements from interpreting these changes as a message, the supply network may gradually increase the voltage at a set rate to indicate that the change in voltage is a communication. This process is also referred to as a slow ramp up of the voltage. Similarly, the supply network may gradually decrease the voltage to the normal level to indicate the message is over. This process is also referred to as a slow ramp down. FIG. 6 shows one example of a communication pulse with a slow ramp up and down. FIG. 17 shows another example of a communication pulse with a slow ramp up and down. The ramp up and ramp down rates themselves, while slow, could be changed and used to communicate information in addition to the pulse duration.

The pulse communication platform may also include error correction. For example, errors in detection can be actively corrected by the element re-sending the command, such as a supply controller, if the expected response does not occur within a certain time period from the communication.

While the above has described a pulse communication platform that communicates from the supply network to the load network, other configurations are also possible. For example, the load network can communicate with the supply network, by imposing current pulses on $I_1$ to $I_n$, the pulse communication network can be used to communicate between any network or device that is connected through a power line so long as the system is transmitting power.

Fault Detection
Detecting a Fault

For fault protection, the supply network 102 includes a protection device 110. In other embodiments, the protection device 110 may be located within the load network, such as within the load controllers 130 and 170. The protection device may be internal or external to a supply controller. Multiple protection devices may be placed along the distribution line allowing sectioning the line and coordinated detection of faults. The protection device 110 may include solid state relays or other types of suitable electrical isolators. The protection device 110 operates to isolate the load networks 120 and 160, remove the energy stored in the distribution lines, shut down other converters, or shut down other energy sources when a fault condition is detected.

In particular, the balancing strategy allows the system 100 to react quickly to an imperfect match between the supply and expected load behavior by a voltage variation or current variation beyond a fine specified threshold. The voltage variation indicates a voltage imbalance and thus a current imbalance. Traditional systems must tolerate a wide range of operating currents such that even in fault conditions it takes time for the system to determine that the current is abnormal and constitutes a fault. Some embodiments of the system described in this specification assume anything other than the expected very narrow range of current levels, changes, and shapes constitutes a fault and trips more quickly. The protection may be triggered based on inconsistencies with a threshold of variances in the current levels, shape, and/or ramp rate as determined by the preprogrammed load curves. This threshold of variance may be determined based on each independent load curve or can be based on when the threshold of variance is exceeded by more than one, or all, of the load network preprogrammed load curves in the system. This is made possible because the system removes random current variations to regulate the current levels, allowing fine tolerances to be set for absolute current level protection. Additionally, because the system controls rates of change or current and voltage, as well as the shape of change (or ramp rate and shape) these values, rate of change and shape of change may be used to determine faults. For example, whereas a classical protection system triggers a fault when it detects variance at 150% above the load after a time delay, the current system may be able to trigger a fault protection scheme for smaller variances, such as 5% above load. Additionally, the current system may be able to instantaneously trigger a fault.

Clearing the Fault and Re-Energization

In the event of any variance outside a specified band, which indicates that the power supply or a power demand does not conform with the corresponding preprogrammed load curve, the protection device 110 may be activated to de-energize the system. Alternatively, the protection device 110 may de-energize the system by sending a signal to other devices to trip. The protection device 110 may be implemented using semiconductor switches or relays that enable or disable current flow. Upon loss of supply network voltage for some short period of time, the load network isolation 132 and 172 opens. The protection device 110 may then re-energize the system 100 with no loads connected.

Upon sensing voltage, the isolation devices 132 and 172 in the load networks 120 and 160 may close in sequence by a control signal or through an embedded algorithm. If a protection device closes and the system 100 detects an imbalance, the protection device 110 may be tripped, and the protection device close sequence may start again, but this time with the faulty segment remaining isolated through embedded logic.

In one embodiment, the load controllers 130 and 170 in the load networks may be programmed to delay the start of power exchange between the load network and the supply network. The delay gives enough time for a simple and low current re-energization of the line under no load, as described above, and also enables the system to easily identify whether the fault has cleared. The protection device 110 may detect that the fault has cleared when the load network does not consume power during the re-energization delay. However, the protection device 110 may detect that the fault has not cleared when the load network does consume fault current during the re-energization delay.

During re-energization, the system 100 can be cleared without impact to the supply network 102 due to the power source 108 which maintains power in the event that a load network is disconnected, and without impact to the load networks 120 and 160 due to the respective energy storage units 128 and 168 which provide power to the respective loads 140 and 180 in the event that one or both load networks 120 and 160 are disconnected from the supply network 102. In other words, the power source may continue to operate, supplying its power to other elements and load networks 120 and 160 may continue to operate by supplying power stored in the respective energy storage units 128 and 168 to the respective loads 140 and 180.

The Protection Device

Figure 7:
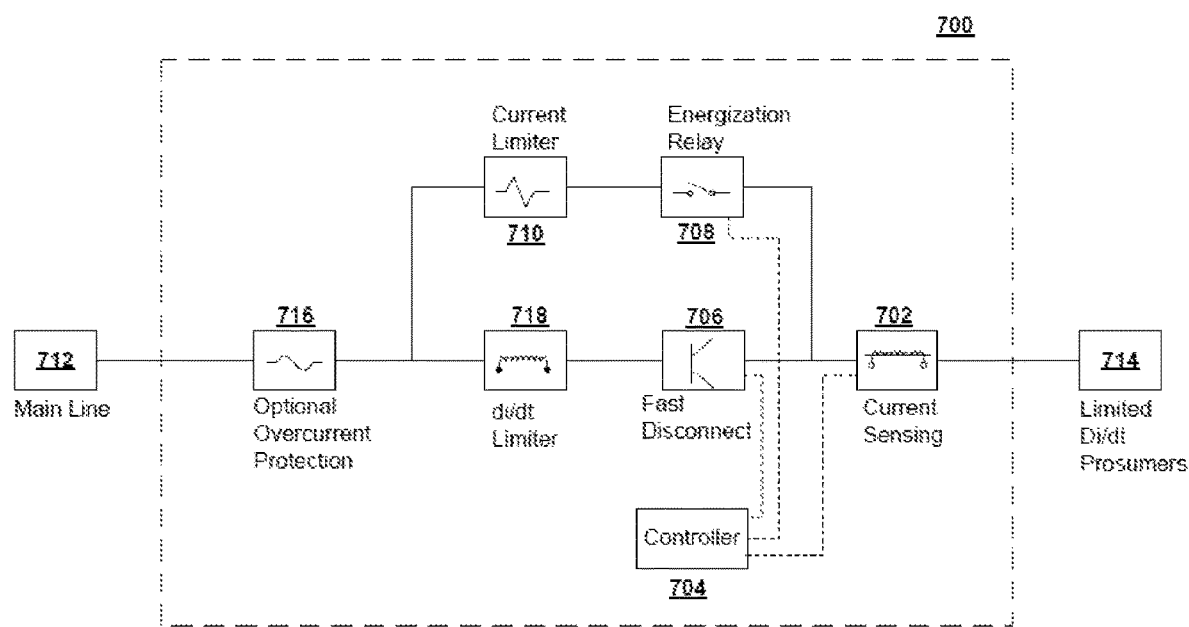
FIG. 7 is a block diagram showing an example of a protection device.

FIG. 7 shows a block diagram of the protection device 700 connected to the main line 712 and load networks, or prosumers, 714. The load networks 120 and 160 integrate energy storage and in many cases renewable generation so that the change in current demanded or provided through the protection device is limited and known.

The protection device incorporates a sensing unit 702 that can detect current and/or voltage to measure, with high bandwidth, the current going to the load networks 120 and 160. Devices need high bandwidth to allow them to detect transients in current or voltage at frequencies higher than the frequencies during normal operation. The current measurement may be sent to a controller 704, which may include a processor and memory, that calculates the derivative of the current, which represent the rate of change of the current. The controller 704 may be programmed with maximum current ramp rates monitored by the di/dt limiter 718 that are indicative of normal operation. Controller 704 may compare the calculated rate of current change, or derivative of the current change, based on the measurements with the maximum current ramp rates. If the measured rate of change is outside the normal range, the controller 704 may open a fast disconnect 706, such as those based on semiconductor devices or solid-state relays, and interrupt the current flow. Controller 704 may also activate a low current, slow responding energization device, such as energization device (e.g., a relay or semiconductor) 708, to energize the previously faulted line. In other embodiments, the energization relay 708 may alternatively be a semiconductor or other devices known in the art. The current flowing through energization relay 708 may be limited by a current limiting device 710, for example, a resistor. Depending on the current flowing through the current sensor 702 when the energization device 708 is activated, the controller 704 can decide if the fault has been cleared.

The controller 704 may incorporate a communication platform with an external controller that enables changing the settings for normal and abnormal rate of current change. The re-energization of the line could be automatically programmed, manually initiated, or remotely initiated through the communication link. A fault current ramp limiting device 710 that may be an inductor that can be inserted in series with the fast disconnect 706 to limit the rate of change of the fault current or voltage. The addition of inductors into the system runs counter to current logic, which seeks to eliminate inductance because it limits the rate of change. In the disclosed system, however, the system is designed to keep the rate of change low. Accordingly, inductors may be introduced to slow the rapid current spikes that typically occur during DC line faults. This allows fuses, and other protection mechanisms with lower current ratings to be employed, which are typically cheaper and safer than higher current alternatives. Classic overcurrent protections can also be included in the device for extra protection or to respond if the protection fails.

Smart Inverters

In another embodiment, the network includes a smart inverter that protects equipment supplied from the inverter AC output by improving speed of operation and increasing the number and types of faults that can be detected and cleared including faults that would not damage the inverter but that could result in damage to external equipment or unsafe conditions for the users. The smart inverter system described detects and/or measures the AC output of the inverter to analyze whether a fault has occurred and can then control the inverter and other devices in the power grid network to protect the power grid network and any devices connected to it from damage due to faults.

In one embodiment, the smart inverter includes a processor and storage device that can perform the analysis necessary to analyze the current and shut down the inverter when a fault occurs. In another embodiment, the inverter can be connected to a control unit with a processor and storage device. The control unit performs the analysis necessary to analyze the current and shut down the inverter. Both embodiments may also communicate with other devices in the power grid network, such as a circuit breaker or fuse box to trigger other power grid protection protocols when a fault occurs.

The Inverter

Several forms of inverters are known in the industry. The present invention can utilize a control unit added to an inverter to both monitor the output of the inverter and control the inverter when a fault is detected.

Figure 8:
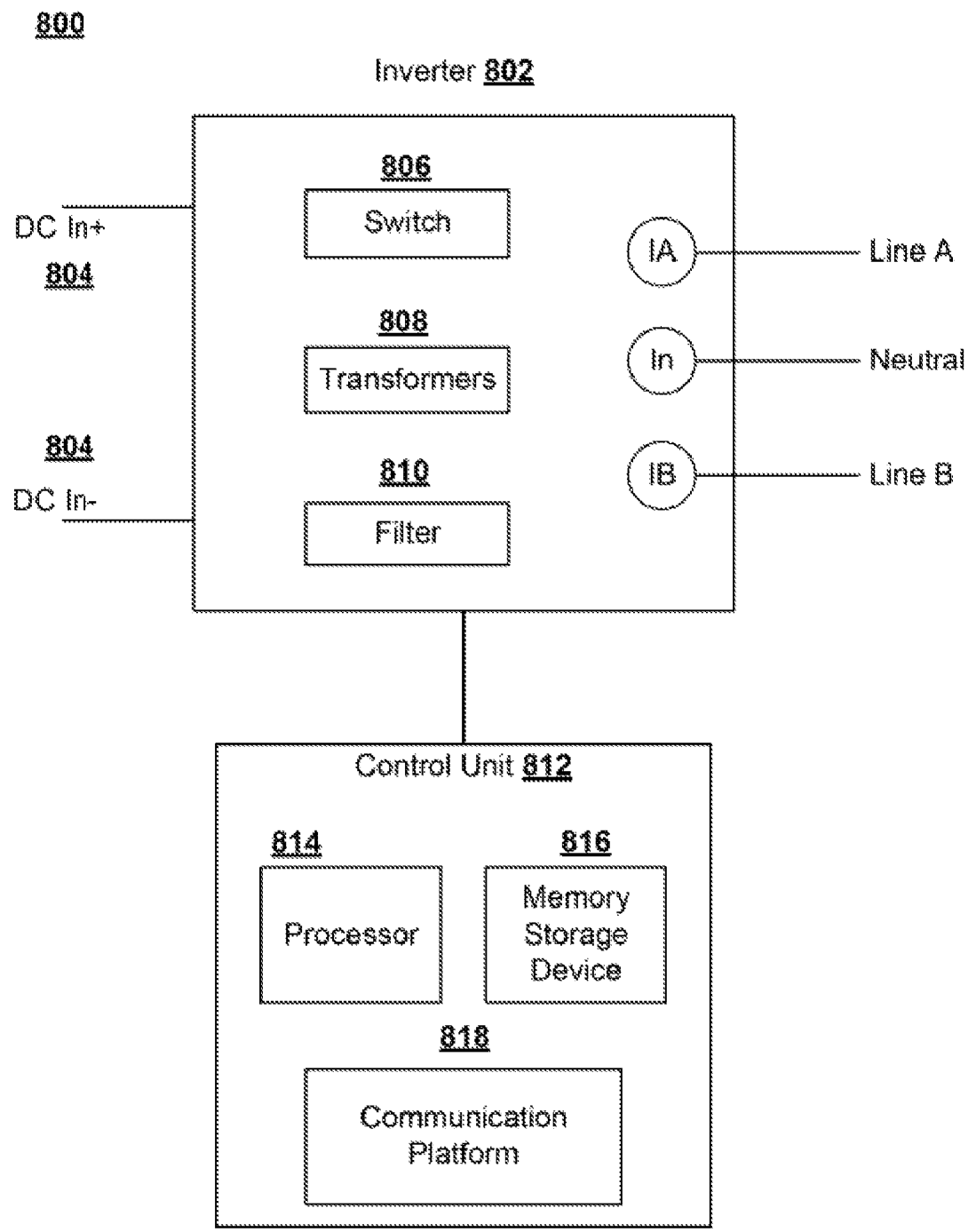
FIG. 8 is a diagram showing an example of a smart inverter fault detection system.

FIG. 8 is a diagram illustrating an example of an inverter 802 that can be used in this system. Other configurations for the inverter are also known and can achieve the invention. Inverter 802 includes an input 804 to receive a DC supply. The DC supply flows to a switch 806 that alternates between at least two paths for the DC energy to flow. These two paths flow to magnetic components 808 to induce an AC supply flow. That AC supply flow is an output of the filter 810 with typical AC supply properties such as current and voltage that can be measured either within the inverter 802 or as the flow leaves the inverter 802.

The switch 806 can take several forms as known in the art. For example, an electromechanical version allows the switch 806 to connect to two contact points where the switch 806 is biased towards one contact point by a spring. An electromagnet is connected to the first contact and pulls the switch towards the second contact. When the switch 806 reaches the second contact, the current to the electromagnet is interrupted and the electromagnet turns off, allowing the spring to move the switch 806 back to the first contact. This allows the switch 806 to alternate rapidly between the two contact points, sending flow through the two paths to create the AC supply. Other configurations for the switch 806 known in the art can also be used. For example, semiconductor switches, transistor switches, thyristor switches, and more.

The above description produces a square wave, but some load networks will need a smooth, sinusoidal wave form. In another embodiment, the inverter 802 may also include hardware that allows the inverter to create the AC supply as a smooth, sinusoidal wave or other wave forms known in the art. To create this smooth, sinusoidal wave form, the inverter can include capacitors, inductors, low-pass filters, resonant filters, rectifiers, antiparallel diodes, and other devices known in the art. This same hardware can also be used to create other wave forms such as modified sine waves known in the art.

The Control Unit

In one embodiment, the control unit 812 includes processor(s) 814 and memory storage device(s) 816. The memory storage device 816 stores the instructions to be carried out by the processor(s) 814 and the data necessary to execute those instructions, such as parameters for the normal operation of the power grid and the conditions that mean a fault has occurred.

The processor(s) 814 may be implemented as one or more known or custom processing devices designed to perform functions of the disclosed methods, such as single- or multiple-core processors capable of executing parallel processes simultaneously. For example, the processor(s) 814 may be configured with virtual processing technologies. The processor(s) 814 may implement virtual machine technologies, including a Java virtual machine, or other known technologies to provide the ability to execute, control, run, manipulate, store, etc., multiple software processes, applications, programs, etc. One of ordinary skill in the art would understand that other types of processor arrangements could be implemented that provide for the capabilities disclosed herein.

The memory storage device(s) 816 may include instructions to enable the processor(s) 814 to execute programs, such as one or more operating systems, server applications, communication processes, and any other type of application or software known to be available on computer systems. The memory storage device(s) 816 may be implemented in volatile or non-volatile, magnetic, semiconductor, tape, optical, removable, non-removable, or another type of storage device or tangible (i.e., non-transitory) computer-readable medium.

In some embodiments, the memory storage device(s) 816 includes instructions that, when executed by the processor(s) 814, perform one or more processes consistent with the functionalities disclosed herein. Methods, systems, and articles of manufacture consistent with the disclosed embodiments are not limited to separate programs or computers configured to perform dedicated tasks.

Figure 9:
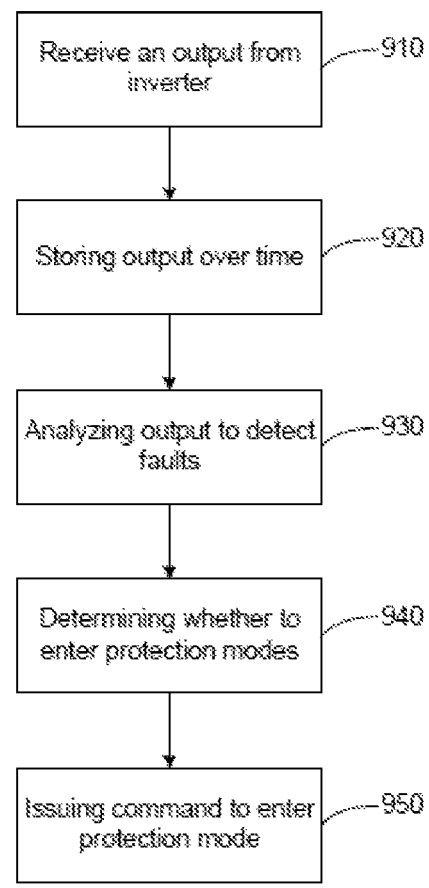
FIG. 9 is a flow chart illustrating the function of the software.

FIG. 9 is a flowchart illustrating the steps of an exemplary fault detection process 900 performed by the processor(s) 814 in accordance with the disclosed embodiments. However, the steps illustrated by the flowchart are only exemplary, and one or more steps may be added or deleted to implement fault detection process 900. Additionally, the steps may be performed in any order that allows the system to detect a fault.

At step 910, the control unit 812 receives an output from the inverter 802. This output can be the current, or the voltage. Alternatively, the output from the inverter can be measurements of the current or voltage from the inverter.

At step 920, the storage device(s) 816 store the outputs from the inverter 802 for multiple points in time. This allows the processor(s) 814 to access data sufficient to determine and analyze how the output has changed over time. For example, the processor(s) 814 could determine the absolute values of the current across a minute, or the rate at which the current changes across a minute or the difference between currents measured at different points.

At step 930, the processor(s) 814 analyze the output from the inverter 802 to determine whether a fault has occurred. There are numerous types of faults that can be detected with this system including GFI, overcurrent, unbalanced voltage (open neutral), and arcing faults.

As one example, a GFI fault can be detected by analyzing the flow of electricity leaving the inverter 802 using either the voltage or current. A GFI fault can be detected by analyzing the flow of electricity at a point where the inverter connects to the load 140 or 160. In this example, ground faults result in current flowing from the inverter 802 output to the ground via the fault and returning through the grounding terminal of the inverter 802. In normal, not faulted conditions, the current flowing through the ground is zero and the algebraic sum of the current flowing through the terminals should be zero. However, when a ground fault occurs, the sum deviates from zero. If the inverter 802 is provided with current sensors in all the power lines as shown in FIG. 8, the measured currents could be added ($I_{total}=I_A+I_n+I_B$) and if the result drifts from zero, the system could conclude that there is a ground fault somewhere in the output line. Alternatively, the inverter 802 can receive the current measurements by a residual current sensor, which physically measures the sum of the three currents and the output of the sensor could be used to determine if there is a ground fault.

As another example, an external arc fault can be detected using the inverter hardware. Traditionally, AC arc fault detectors are provided external to the inverters and using separate sensors from the ones used for inverter power control. The inverter 802 can measure the power signal through the outputs as described herein. The control unit 812 may then apply signal processing with internal algorithms known in the art to identify external arc faults based on those measurements, such as current measurements.

As another example, the inverter 802 could detect an open neutral fault between the inverter 802 and the load. In some embodiments, the inverter 802 may produce a split phase power signal, which provides two sinusoidal voltages out of phase by 180 degrees. These may include a common point, or neutral, that allows some loads to be placed from line to line so that they receive twice the phase voltage or receive the phase voltage, while others are connected. These types of systems are common in residential applications. In this embodiment, the inverter 802 independently regulates the voltage of each of the two phases and maintains the 180 degrees phase shift to produce the split phase. Using split phase configurations can sometimes result in damage to the neutral conductor, creating an open neutral fault that could produce over voltages in some of the loads connected between phase and neutral.

In some embodiments, the inverter could be used to detect an open neutral fault. One characteristic of split phase systems is that the current flowing through the two lines is typically identical, or balanced. In this case, the inverter 802 current measurements may read zero current in the neutral. However, a reading of zero in the neutral could also be due to an open neutral fault. If the inverter is provided with a neutral current sensor, and the current becomes zero (In=0), the processor(s) 814 in the control unit 812 may command the inverter 802 to produce a small deviation in magnitude or phase of the voltage between the two phases (e.g., VAn>VBn). In this instance, the voltage in one phase is now slightly different from the voltage on the other phase or the phase angle is not exactly 180 degrees, making the previously balanced loads out of balance and producing current through the neutral. The control unit 812 may then verify that the neutral connection is still intact. If the deviation in voltage does not produce a measurable neutral current, the control unit may conclude that there is an open neutral fault.

In other embodiments, the neutral current does not have to be measured. The neutral current may alternatively be calculated as the algebraic sum of the two-phase currents ($I_n=I_A+I_B$). In this embodiment, the inverter 802 described herein may then use this calculated value in place of the measured value to detect the open neutral fault.

At step 940, the processor(s) 814 determine whether to enter one of the protection modes stored on the storage device(s) 816. The storage device(s) 816 can store one or more protection modes for protecting the network. One of these protection modes can be a shut off of the inverter's 802 switching operation, stopping the flow of AC current. Other protection modes could include tripping a circuit breaker to stop the flow of AC current or causing a fuse box to blow a fuse.

At step 950, the processor(s) 814 issue a command to the appropriate device to enter the protection modes selected to protect the power grid system 100. For example, these commands can be sent to the inverter 802, a circuit breaker, or a fuse box.

In one embodiment, the control unit includes a sensor that measures the AC supply of the inverter 802. This sensor can measure the current, voltage, and/or any other relevant characteristic of the AC supply.

Inverter and Control Unit Incorporated Together

Figure 10:
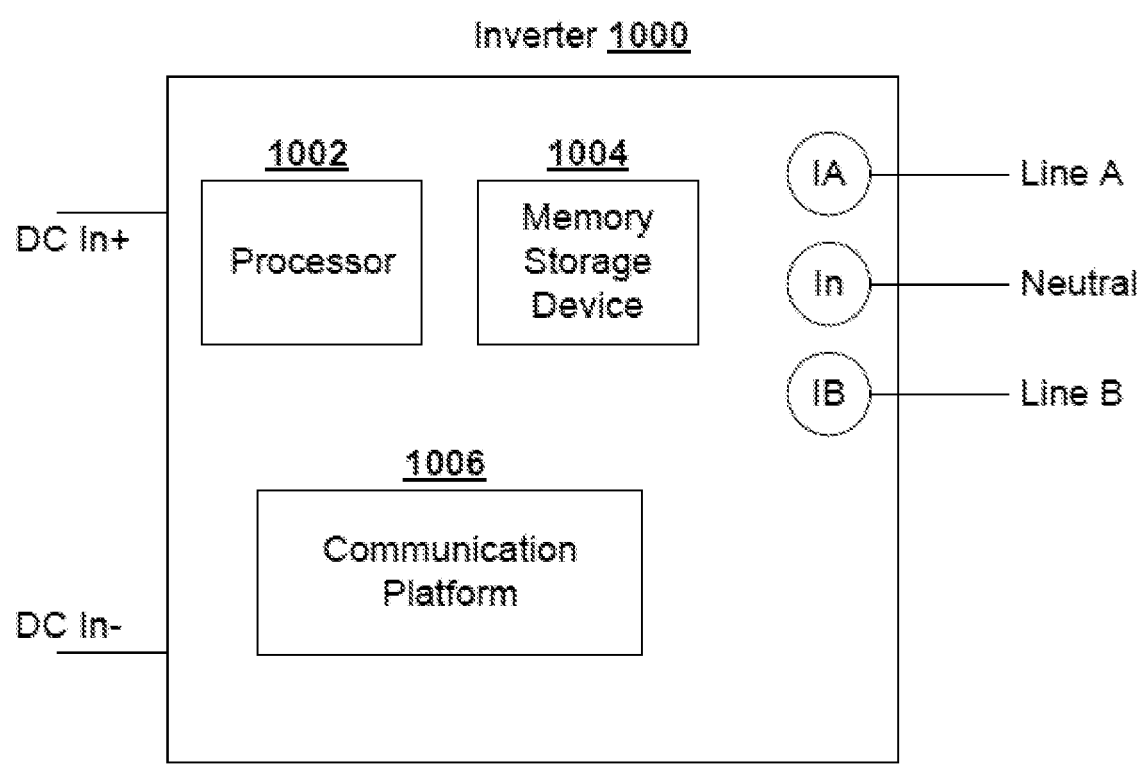
FIG. 10 is a diagram showing an example of smart inverter fault detection system with the control unit integrated into the inverter device.

FIG. 10 is a block diagram illustrating another embodiment where the control unit, including processor(s) 1002, memory storage device(s) 1004, and communication platform 1006, is incorporated into the inverter 1000. In this embodiment, both the inverter 1000 and the control unit operate in the same way as inverter 802 and control unit 812 described above.

Advantages/Uses

This technique is different from traditional approaches that rely on a large energy flow to the fault to initiate protective action. Rather, this technique uses the predictability of the current flows to emulate a multi-terminal differential current protection scheme. Any current flow that deviates from the preprogrammed load curves indicates a system voltage or current that does not correspond to the expected predicted voltage or current profiles. Because current limited active power sources will not provide current to trip breakers or blow fuses, high resistance faults and in line arcing may go undetected in conventional power grid systems. Fault conditions are not consistent with the expected current and voltage profiles in embodiments of the invention, and therefore the system 100 would trip and isolate the problem. This fault detection approach provides a faster response to fault conditions with better reliability, less damage, and higher safety relative to conventional power systems and other DC power techniques without requiring communication with other components of the power grid system 100 and without requiring current sensing by additional current measurement devices at remote terminals.

To improve the economics and safety of the system 100 as a whole, the load battery and its power inverter can be configured to replace the traditional metering and main panel protection at the load network. Embodiments of the invention leverage the high switching speed of a power inverter by using current sensing circuits and solid-state relays to replace the traditional panel circuit breakers. When a fault situation is detected, the power inverter is disabled instantly, and the appropriate circuit is isolated by opening the relay, so the power inverter can return to service safely. The safety of full system ground fault protection can be increased using such a design.

Additional embodiments exist that apply the principles of this invention to systems ranging from appliance-level power control to single building power control, to entire power grid control. Any system configured to use storage or additional power sources to eliminate the need for random flows across the network can implement the principles disclosed. For example, when the system is implemented in a home and the load is completely DC, the energy storage may be distributed within the home and supplied by the DC controller using voltages low enough to eliminate the need for grounded fixtures, lowering the cost of installation significantly. Building on the concept of power over Ethernet and the technique described above of constant power supply to load networks with storage, the system may incorporate small scale energy storage at every appliance which consumes more than 100 watts peak (or another standard level). An appliance may be more efficient if it operates constantly at lower loads (e.g., a refrigerator with a motor and compressor that are far too big if it cycles and runs only half the time), or if a dedicated energy storage is charged with a low constant supply and drawn from when the appliance is in operation.

A few implementations have been described in detail above, and various modifications are possible. For example, in implementations where the characteristics of a power source is predictable and consistent, a supply network may not include a storage controller and an energy storage unit as a power buffer. Similarly, in implementations where the characteristics of a load is predictable and consistent, a load network may not include a storage controller and an energy storage unit as a power buffer. While the implementations described focus on DC systems, these implementations may also apply to AC systems.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The invention claimed is:

1. A power distribution system capable of detecting faults, the system comprising:
   at least a portion of a supply network;
   a load controller that controls current flow with a current level of $I_1$ into a load network that provides power to one or more loads from the at least a portion of the supply network according to a preprogrammed load curve; and
   a protection system that isolates the at least a portion of the supply network from the load controller in response to detecting a current value either greater than a band centered on the preprogrammed load curve or less than the band centered on the preprogrammed load curve, the current value between a maximum value and a minimum value of the preprogrammed load curve.

2. The system of claim 1, wherein the supply network is a DC network.

3. The system of claim 1, wherein the supply network is an AC network.

4. The system of claim 1, wherein the supply network comprises a supply controller that maintains a supply voltage of the supply network.

5. The system of claim 4, wherein the supply network further comprises an energy storage, wherein the supply controller maintains the supply voltage using the energy storage.

6. The system of claim 4, wherein the supply controller is configured to vary the supply voltage to send a communication pulse at a predetermined voltage or shape.

7. The system of claim 6, wherein the load controller comprises:
a voltage sensor,
a processor, and
a memory, wherein the memory includes instructions that, when executed by the processor, cause the processor to extract the communication pulse from a power signal provided by the supply network using the voltage sensor.

8. The system of claim 7, wherein the memory further comprises instructions that, when executed by the processor, process the communication pulse to determine a command issued to the load controller.

9. The system of claim 8, wherein the processor determines the command based on a length of time the supply voltage stays at the predetermined voltage.

10. The system of claim 8, wherein the processor determines the command based on the shape of the power signal to or from the supply voltage.

11. The system of claim 6, wherein varying the supply voltage to send the communication pulse comprises changing the supply voltage from an initial level to the predetermined voltage at a rate slower than the normal transience of a distribution line in the supply network.

12. The system of claim 7, wherein the processor determines a start of the communication pulse based on detecting the change in the supply voltage to the predetermined voltage at the set rate.

13. The system of claim 6, wherein sending the communication pulse further comprises ending the communication pulse by changing the supply voltage from the predetermined voltage at a set rate.

14. The system of claim 7, wherein the processor determines an end of the communication pulse based on detecting the change in the supply voltage from the predetermined voltage at a set rate.

15. The system of claim 6, where the supply controller is further configured to perform communication error correction by retransmitting the communication pulse if an expected response to a command communicated by the communication pulse is not detected within a time period.

16. The system of claim 4, wherein the load controller comprises:
a voltage sensor,
a processor, and
a memory, wherein the memory includes instructions that, when executed by the processor, cause the processor to detect a fault when the voltage sensor measures a supply voltage from the supply network that does not follow an expected pattern set by the source controller.

17. The system of claim 1, wherein
the system further comprises an energy storage in the load network, and
the load controller controlling the current flow comprises storing or drawing energy from the energy storage to keep the controlled current flow in accord with the preprogrammed load curve.

18. The system of claim 17, wherein the energy storage comprises a storage controller and an energy storage device, the storage controller controlling storage or draw of energy from the energy storage device.

19. The system of claim 18, wherein the storage controller communicates with the load controller to adjust a position on the preprogrammed load curve based on the amount of energy stored in the energy storage device.

20. The system of claim 18, wherein the energy storage device comprises a battery.

21. The system of claim 1, wherein the load controller changes levels on the preprogrammed load curve in response to demand of the one or more loads.

22. The system of claim 1, wherein the one or more loads comprises a building.

23. The system of claim 1, wherein the one or more loads comprises an inverter.

24. The system of claim 23, wherein the inverter comprises:
a memory;
a processor; and
a circuit for converting DC power to AC power,
wherein the memory storage device includes instructions that, when executed by the processor, perform a method comprising:
receiving an output of the inverter;
storing the output of the inverter for multiple points in time;
analyzing the output of the inverter for multiple points in time to detect one or more faults;
determining whether one or more of the detected faults requires the inverter to enter one or more protection modes; and
issuing a command to cause the inverter to enter one of the one or more protection modes based on the determination.

25. The system of claim 2, wherein the protection system comprises a component that limits the rate of change of a fault current.

26. The system of claim 25, wherein the component is an inductor.

27. The system of claim 1, wherein the protection system comprises a protection device, the protection device comprising:
a current sensing unit that measures a current;
a controller that compares current measurements from the current sensing unit to a predetermined pattern; and
a fast disconnect that receives a signal from the controller to act when a pattern of the measured current is inconsistent with the predetermined pattern.

28. The system of claim 27, wherein the fast disconnect comprises a solid-state device.

29. The system of claim 1, wherein detecting the current pattern that is inconsistent with the preprogrammed load curve is based on an observed ramp rate.

30. The system of claim 1, wherein detecting the current pattern that is inconsistent with the preprogrammed load curve is based on a shape of the current pattern.

31. The system of claim 1, wherein detecting the current pattern that is inconsistent with the preprogrammed load curve is based on a level of the current pattern.

32. The system of claim 1, wherein the load controller is a first load controller, the current level of $I_1$ into the load network is a first current level of $I_1$ into a first load network, and the preprogrammed load curve is a first preprogrammed load curve, the system further comprising:
a second load controller that controls current flow with a second current level of $I_2$ into a second load network from the at least a portion of the supply network according to a second preprogrammed load curve.

33. The system of claim 32, wherein the first preprogrammed load curve and the second preprogrammed load curve are the same.

34. The system of claim 32, wherein the first preprogrammed load curve and the second preprogrammed load curve are different.

35. The system of claim 32, wherein detecting the current pattern that is inconsistent with the preprogrammed load curve comprises detecting the current pattern is inconsistent with both the first preprogrammed load curve and the second preprogrammed load curve.

36. A system comprising:
    at least a portion of a supply network;
    a load controller that controls current flow with a current level of $I_1$ into a load network that provides power to one or more loads from the at least a portion of the supply network according to a preprogrammed load curve;
    a protection system that isolates the at least a portion of the supply network from the load controller in response to detecting a current pattern that is inconsistent with the preprogrammed load curve;
    wherein the supply network comprises a supply controller that maintains a supply voltage of the supply network;
    wherein the supply controller is configured to vary the supply voltage to send a communication pulse at a predetermined voltage or shape;
    wherein the load controller comprises:
        a voltage sensor,
        a processor, and
        a memory, wherein the memory includes instructions that, when executed by the processor, cause the processor to extract the communication pulse from a power signal provided by the supply network using the voltage sensor;
    wherein the memory further comprises instructions that, when executed by the processor, process the communication pulse to determine a command issued to the load controller; and
    wherein the processor determines the command based on the rate at which the power signal transitions to the predetermined voltage.

37. A system comprising:
    at least a portion of a supply network;
    a load controller that controls current flow with a current level of $I_1$ into a load network that provides power to one or more loads from the at least a portion of the supply network according to a preprogrammed load curve;
    a protection system that isolates the at least a portion of the supply network from the load controller in response to detecting a current pattern that is inconsistent with the preprogrammed load curve;
    wherein the protection system comprises a protection device, the protection device comprising:
        a current sensing unit that measures a current;
        a controller that compares current measurements from the current sensing unit to a predetermined pattern; and
        a fast disconnect that receives a signal from the controller to act when a pattern of the measured current is inconsistent with the predetermined pattern; and
    wherein comparing the current measurements from the current sensing unit to the predetermined pattern comprises comparing a ramp rate of the current measurements to a predetermined ramp rate.

38. The system of claim 37, wherein comparing the ramp rate of the current measurements to the predetermined ramp rate comprises calculating the derivative of the current measurements.

* * * * *